(12) United States Patent
Kajita

(10) Patent No.: US 11,036,107 B2
(45) Date of Patent: Jun. 15, 2021

(54) LIQUID CRYSTAL DISPLAY DEVICE

(71) Applicant: Panasonic Liquid Crystal Display Co., Ltd., Himeji (JP)

(72) Inventor: Daisuke Kajita, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 16/774,748

(22) Filed: Jan. 28, 2020

(65) Prior Publication Data

US 2020/0278584 A1 Sep. 3, 2020

(30) Foreign Application Priority Data

Feb. 28, 2019 (JP) .............................. JP2019-035743
Feb. 28, 2019 (JP) .............................. JP2019-035825

(51) Int. Cl.
*G02F 1/1362* (2006.01)
*G02F 1/1343* (2006.01)
*G02F 1/1333* (2006.01)
*G02F 1/1368* (2006.01)
*G02F 1/1339* (2006.01)
*G02F 1/1337* (2006.01)

(52) U.S. Cl.
CPC ...... *G02F 1/136286* (2013.01); *G02F 1/1337* (2013.01); *G02F 1/1339* (2013.01); *G02F 1/13338* (2013.01); *G02F 2201/121* (2013.01); *G02F 2201/123* (2013.01)

(58) Field of Classification Search
CPC ............. G02F 1/1368; G02F 1/136286; G02F 1/136227; G02F 1/134363; G02F 1/134309; G02F 1/1333; G02F 1/133345; G02F 1/13338; G02F 1/1339; G02F 1/1337; G02F 1/133707; G02F 1/1343; G02F 1/1362; G02F 2001/134372; G02F 2001/136272; G02F 2001/134318; G02F 2201/123; G02F 2201/121; G09G 3/3677; G09G 3/36; G09G 2300/0426
See application file for complete search history.

(56) References Cited

U.S. PATENT DOCUMENTS

| | | |
|---|---|---|
| 2015/0268526 A1 | 9/2015 | Kakinuma et al. |
| 2019/0079620 A1* | 3/2019 | Yoshida .............. G06F 3/04164 |
| 2019/0196638 A1 | 6/2019 | Tominaga et al. |

FOREIGN PATENT DOCUMENTS

| | | |
|---|---|---|
| WO | 2014/108972 | 7/2014 |
| WO | 2017/213173 | 12/2017 |

* cited by examiner

*Primary Examiner* — Thoi V Duong
(74) *Attorney, Agent, or Firm* — Hamre, Schumann, Mueller & Larson, P.C.

(57) ABSTRACT

A liquid crystal display device includes: transistors and pixel electrodes respectively provided in each pixels; common electrode facing the pixel electrodes; gate lines extending along the first direction and supplying gate signals to the transistors, respectively; gate lead lines extending in the second direction and each connected to a corresponding gate line at at least one of a plurality of intersections with the gate lines; data lines extending along the second direction and supplying data signals to the transistors respectively; and common lines extending along the second direction and connected to the common electrode. In a planar view, each of the common lines and each of the gate lead lines overlap partially.

19 Claims, 13 Drawing Sheets

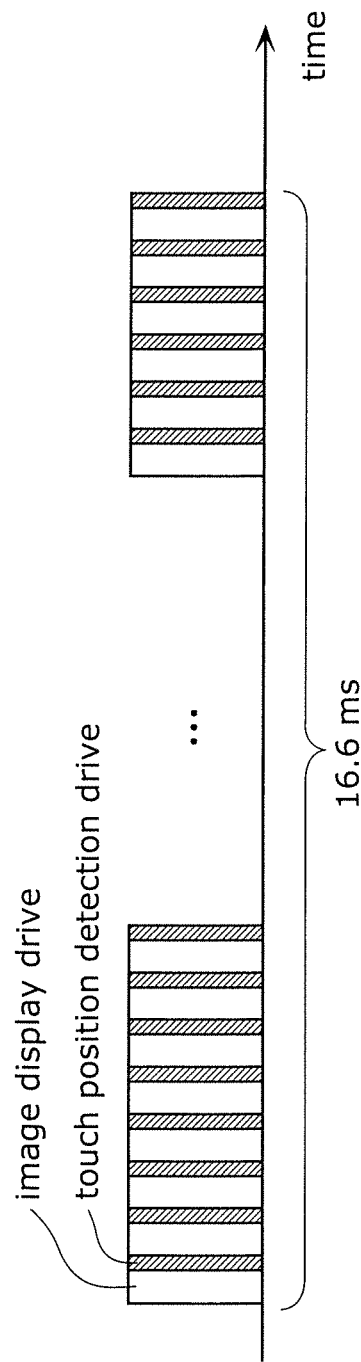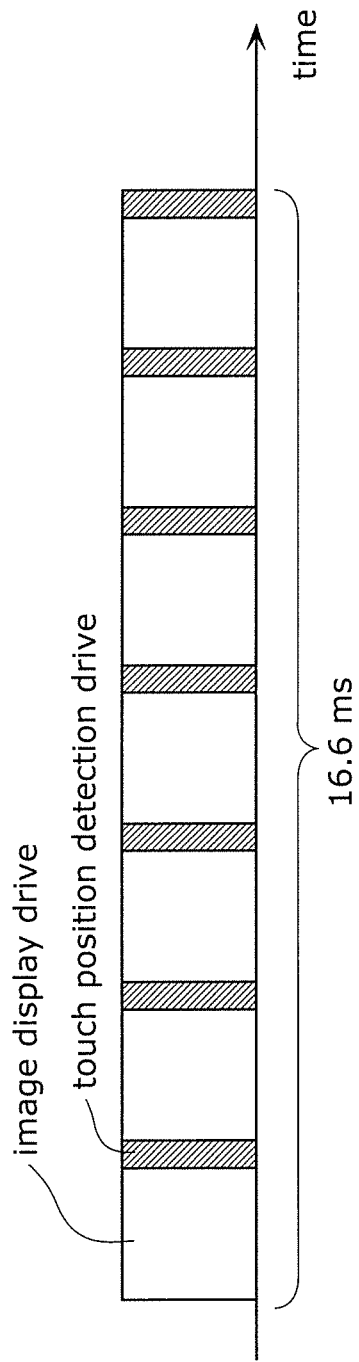

LIQUID CRYSTAL DISPLAY DEVICE

CROSS-REFERENCE TO RELATED APPLICATION

This application claims priority from Japanese application JP 2019-035825, filed on Feb. 28, 2019 and Japanese application JP 2019-035743, filed on Feb. 28, 2019. These Japanese applications are incorporated herein by reference.

BACKGROUND

The present disclosure relates to a liquid crystal display device and more particularly relates to a liquid crystal display device having a touch function.

In recent years, a liquid crystal display device having both a touch function and a display function has been developed. In a liquid crystal display device having a touch function, for example, touch sensing is performed by a capacitance method. In this case, a position touched by a user is sensed by detecting, with a touch electrode, a change in capacitance generated when a pointer such as the user's finger or pen touches or approaches a display screen.

As the touch sensing by the capacitance method, there is known a self-capacitive method that detects a change in capacitance between a touch object such as the finger or pen and a touch electrode (Rx electrode) when the touch object touches the liquid crystal display device, and a mutual capacitive method that detects a change in capacitance between two touch electrodes (Rx electrode, Tx electrode).

As a structure of a liquid crystal display device having a touch function, there are known an out-cell method in which a touch panel having the touch function is attached to the surface of the liquid crystal display panel and an in-cell method in which the liquid crystal display device itself has the touch function.

For example, International Publication No. WO/2017/213173 discloses an in-cell type liquid crystal display device (in-cell touch panel) having a touch function. The liquid crystal display device disclosed in International Publication No. WO/2017/213173 includes a plurality of gate lines extending in the row direction, a plurality of data lines extending in the column direction, a pixel electrode provided in each of the plurality of pixels, a plurality of common electrodes (counter electrodes) provided facing the plurality of pixel electrodes, and signal lines connected to the common electrodes as touch lines. In the liquid crystal display device disclosed in International Publication No. 2017/213173, a touch drive signal for detecting a touch position is supplied to the counter electrode, so that a touch detection signal is received via the signal line, and a change in capacitance at the position of the counter electrode is detected to sense the touch position.

SUMMARY

A liquid crystal display device includes: a TFT substrate on which a thin film transistor (TFT), pixel electrodes and various wires are formed; a counter substrate facing the TFT substrate; and a liquid crystal layer disposed between the TFT substrate and the counter substrate.

In the liquid crystal display device, a plurality of spacers are disposed between the TFT substrate and the counter substrate so as to keep a gap between the TFT substrate and the counter substrate (cell gap) uniform in the entire area of the image display region.

Conventionally, beads or the like have been dispersed in the liquid crystal layer as spacers, but in recent years, a plurality of columnar spacers are formed on the counter substrate in order to more accurately control the gap between the TFT substrate and the counter substrate.

However, due to irregularities on the surface of the uppermost layer of the TFT substrate, when spacers are provided on the counter substrate, it is not easy to keep the gap between the TFT substrate and the counter substrate uniform in the entire liquid crystal display panel.

An aspect of the present disclosure provides a liquid crystal display device that can easily keep a cell gap uniform.

In the liquid crystal display device, an alignment film is formed to control initial alignment angles of liquid crystal molecules in the liquid crystal layer. The alignment film is formed by applying an alignment film liquid to the TFT substrate.

However, it is difficult to uniformly apply the alignment film liquid over the entire area of the TFT substrate. When the alignment film liquid is not uniformly applied to the entire area of the TFT substrate, the liquid crystal molecules in the liquid crystal layer cannot be initially aligned at a desired angle, and the image quality deteriorates.

Another aspect of the present disclosure provides an in-cell touch panel that can prevent reduction in image quality.

A liquid crystal display device according to a present disclosure has an image display region made up of pixels arranged in a first direction and a second direction intersecting the first direction. The liquid crystal display device includes: transistors and pixel electrodes respectively provided in each pixels; common electrode facing the pixel electrodes; gate lines extending along the first direction and supplying gate signals to the transistors, respectively; gate lead lines extending in the second direction and each connected to a corresponding gate line at at least one of a plurality of intersections with the gate lines; data lines extending along the second direction and supplying data signals to the transistors respectively; and common lines extending along the second direction and connected to the common electrode, wherein in a planar view, each of the common lines and each of the gate lead lines overlap partially.

A liquid crystal display device according to another present disclosure has an image display region made up of pixels arranged in a first direction and a second direction intersecting the first direction. The liquid crystal display device includes: transistors and pixel electrodes respectively provided in each pixels; common electrodes arranged in each of the first direction and the second direction, each facing one or more of the pixel electrodes and provided separately from each other; gate lines extending along the first direction and supplying gate signals to the transistors, respectively; data lines extending along the second direction and supplying data signals to the transistors respectively; and touch lines extending along the second direction; an insulating film formed between the common electrodes and the touch lines; and an alignment film covering the pixel electrode, wherein each touch line is connected to a corresponding common electrode via a contact hole formed in the insulating film, and in a planar view, the contact hole partially overlap the touch line.

A liquid crystal display device according to another present disclosure has an image display region made up of pixels arranged in a first direction and a second direction intersecting the first direction. The liquid crystal display device includes: transistors and pixel electrodes respectively provided in each pixels; common electrodes arranged in each of the first direction and the second direction, each facing one or more of the pixel electrodes and provided separately from each other; gate lines extending along the first direction and supplying gate signals to the transistors, respectively; data lines extending along the second direction and supplying data signals to the transistors respectively; and touch lines extending along the second direction; an insulating film formed between the common electrodes and the touch lines; a contact film disposed in a same layer as the pixel electrode and away from the pixel electrode; and an alignment film covering the pixel electrode, wherein each of the plurality of touch lines is connected to a corresponding common electrode via a contact hole formed in the insulating film, the contact hole is formed on each of the touch lines, and in a planar view, the contact film is formed to partially overlap the contact hole.

BRIEF DESCRIPTION OF THE DRAWINGS

FIG. 4A is a diagram showing an example of image display driving and touch position detection driving in the liquid crystal display device;

FIG. 4B is a diagram showing another example of image display driving and touch position detection driving in the liquid crystal display device;

DETAILED DESCRIPTION

Figure 1:
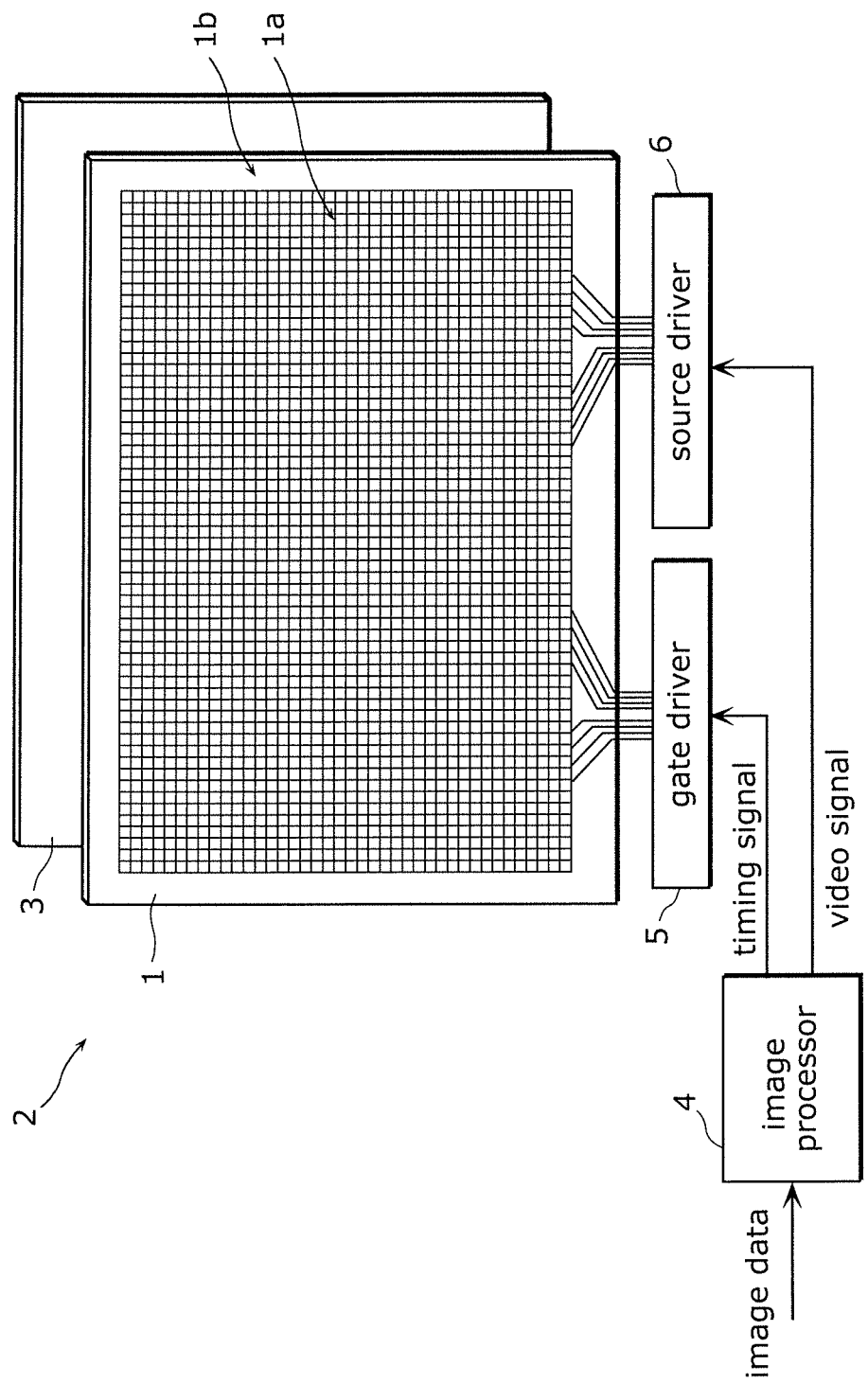
FIG. 1 is a diagram schematically showing a schematic configuration of a liquid crystal display device according to an exemplary embodiment.

Hereinafter, exemplary embodiments will be described with reference to the drawings. The following exemplary embodiments provide comprehensive or specific examples of the present disclosure. Numerical values, shapes, materials, components, disposition positions of the components, connection modes of the components, steps, and order of the steps that are illustrated in the following exemplary embodiments are examples, and therefore are not intended to limit the present disclosure. Among the components in the following exemplary embodiments, the components that are not recited in the independent claims indicating the broadest concept are described as an optional component.

The drawings are schematic diagrams, and not necessarily strictly illustrated. In the drawings, substantially the same configuration is designated by the same reference numerals, and overlapping description will be omitted or simplified.

Exemplary Embodiment

Figure 2:
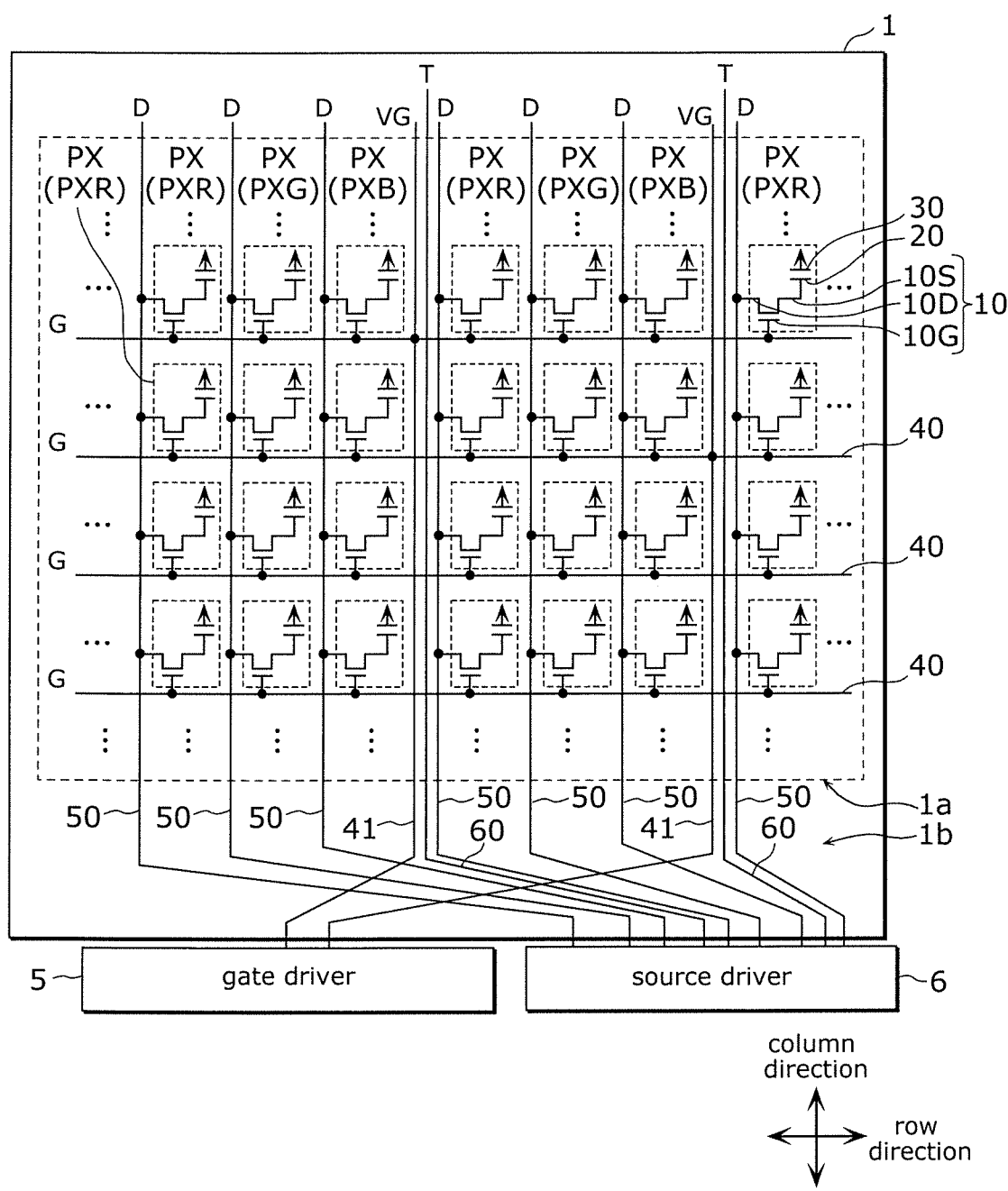
FIG. 2 is a diagram showing a pixel circuit of a liquid crystal display device used in the image display device according to the exemplary embodiment.
Figure 3:
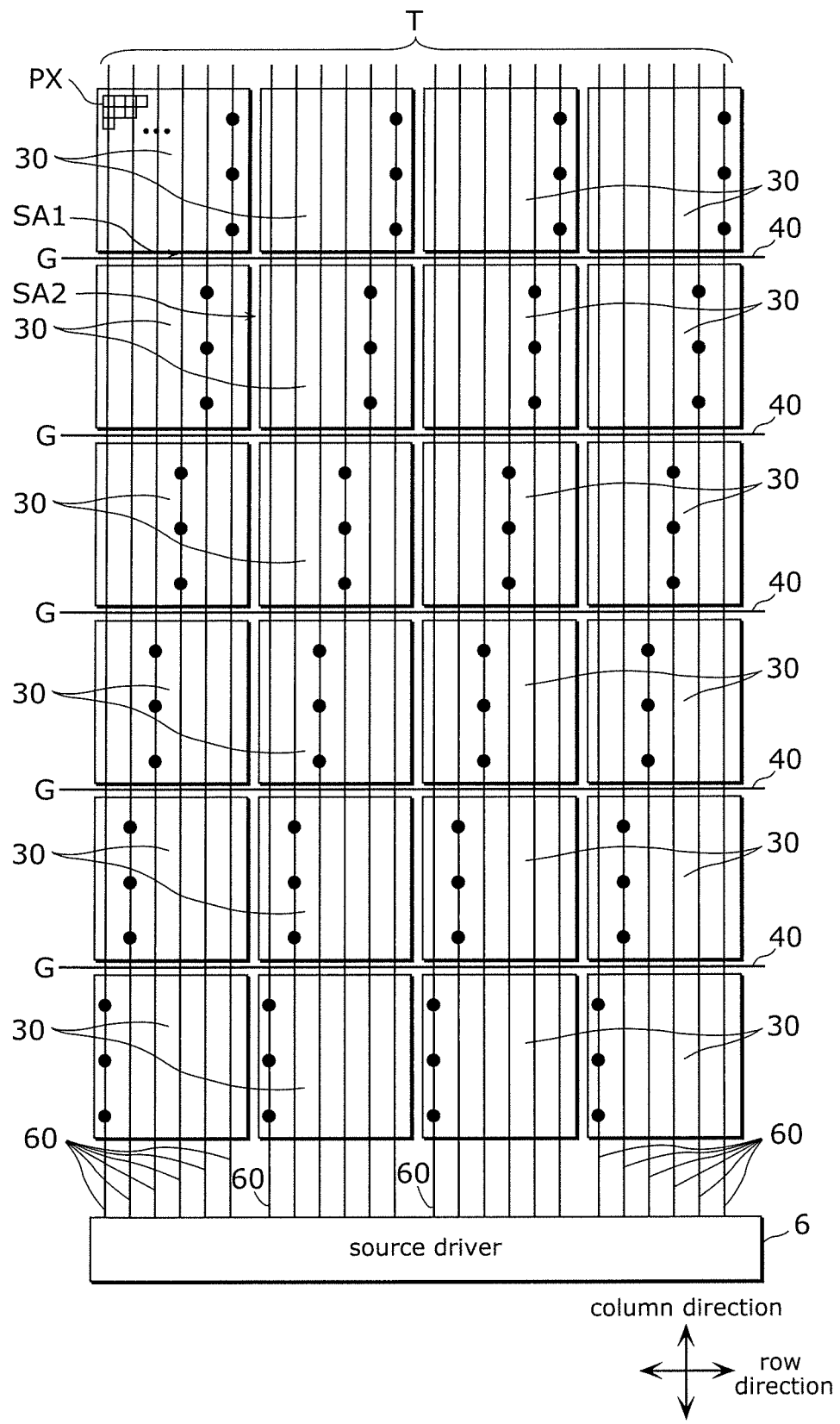
FIG. 3 is a diagram showing an example of an arrangement of common electrodes in the liquid crystal display device according to the exemplary embodiment.

A schematic configuration of image display device 2 including liquid crystal display device 1 according to an exemplary embodiment will be described with reference to FIGS. 1 to 3. FIG. 1 is a diagram schematically showing a schematic configuration of image display device 2 according to the first exemplary embodiment. FIG. 2 is a diagram showing a pixel circuit of liquid crystal display device 1 used in the same image display device 2. FIG. 3 is a diagram showing an example of the arrangement of common electrodes 30 in the same liquid crystal display device 1. In FIG. 2, "G" denotes gate line 40, "D" denotes data line 50, "T" denotes touch line 60, and "VG" denotes gate lead line 41. In FIG. 3, black circles indicate contact portions between the respective common electrodes 30 and touch lines 60.

Image display device 2 is an example of a display device that displays an image (video) of a still image or a moving image. As shown in FIG. 1, image display device 2 includes liquid crystal display device 1, backlight 3, and image processing unit 4.

Liquid crystal display device 1 is a liquid crystal display panel on which an image is displayed. Liquid crystal display device 1 is disposed on a light emission side of backlight 3. Therefore, light emitted from backlight 3 enters liquid crystal display device 1.

A liquid crystal driving method of liquid crystal display device 1 is a horizontal electric field method such as an in-plane switching (IPS) method and a fringe field switching (FFS) method. In liquid crystal display device 1, for example, voltage control is performed by a normally black method, but the voltage control method is not limited to the normally black method.

As shown in FIGS. 1 and 2, liquid crystal display device 1 includes image display region 1a (active region) and frame region 1b surrounding image display region 1a. A color image or a monochrome image is displayed in image display region 1a.

Image display region 1a is a display region (effective region) in which an image is displayed, and includes, for example, a plurality of pixels PX arranged in a first direction and a second direction intersecting the first direction. In the present exemplary embodiment, the first direction and the second direction are orthogonal to each other. Specifically, the first direction is the row direction, and the second direction is the column direction orthogonal to the row direction. Therefore, image display region 1a is made up of a plurality of pixels PX arranged in the row direction and the column direction. That is, the plurality of pixels PX are arranged in a matrix.

Frame region 1b is a peripheral region of liquid crystal display device 1 and is located outside image display region 1a. Frame region 1b is a non-display region (invalid region) where no image is displayed. In the present exemplary embodiment, a planar view shape of liquid crystal display device 1 is a rectangular shape. Therefore, a planar view shape of image display region 1a is a rectangular shape, and a planar view shape of frame region 1b is a rectangular frame shape.

The plurality of pixels PX are made up of a plurality of types of pixels arranged periodically and repeatedly along the row direction. Specifically, the plurality of pixels PX are made up of three types of pixels including red pixel PXR, green pixel PXG, and blue pixel PXB. In this case, in the present exemplary embodiment, the three pixels of red pixel PXR, green pixel PXG, and blue pixel PXB are arranged in this order as one set repeatedly along the row direction. Note that the pixels PX of the same type are arranged in the column direction.

As shown in FIG. 2, liquid crystal display device 1 includes transistor 10 and pixel electrode 20 provided in each of the plurality of pixels PX, and common electrode 30 facing pixel electrode 20.

Further, liquid crystal display device 1 includes a plurality of gate lines 40 (scanning lines) extending along the row direction which is the first direction and a plurality of data lines 50 (video signal lines) extending along the column direction which is the second direction orthogonal to the first direction.

Liquid crystal display device 1 further includes a plurality of gate lead lines 41 connected to gate lines 40. The plurality of gate lead lines 41 extend in the same direction as the plurality of data lines 50. That is, the plurality of gate lead lines 41 extend in the column direction like touch lines 60. Therefore, the plurality of gate lead lines 41 are orthogonal to the plurality of gate lines 40.

Further, liquid crystal display device 1 according to the present exemplary embodiment is an in-cell type liquid crystal display panel (in-cell touch panel) having not only a display function but also a touch function. Therefore, liquid crystal display device 1 further includes a plurality of touch lines 60 for detecting a touch position when a user touches liquid crystal display device 1. The plurality of touch lines 60 extend in the same direction as the plurality of data lines 50. Specifically, the plurality of touch lines 60 extend in the column direction.

Transistor 10 provided in pixel PX is a thin film transistor (TFT), and includes gate electrode 10G, source electrode 10S, and drain electrode 10D. Note that in the present specification, source electrode 10S and drain electrode 10D may be collectively referred to as a source/drain electrode. The source/drain electrode means at least one of source electrode 10S or drain electrode 10D, only either source electrode 10S or drain electrode 10D, or both source electrode 10S and drain electrode 10D.

Pixel electrodes 20 are provided in the plurality of pixels PX. In each of the plurality of pixels PX, pixel electrode 20 is connected to gate line 40 and data line 50 via transistor 10.

In the present exemplary embodiment, one transistor 10 and one pixel electrode 20 are provided for each pixel PX, but a plurality of transistors 10 and a plurality of pixel electrodes 20 may be provided for each pixel PX.

Common electrode 30 is a counter electrode facing pixel electrode 20. As shown in FIG. 3, in the present exemplary embodiment, a plurality of common electrodes 30 are provided. Common electrodes 30 are arranged in the row direction and the column direction. That is, Common electrodes 30 are arranged in a matrix. The same common voltage (Vcom) is applied to each of the plurality of common electrodes 30.

Common electrode 30 has a rectangular shape and faces one or more pixel electrodes 20. In the present exemplary embodiment, Common electrode 30 has a rectangular shape provided across the plurality of pixels PX, and faces the plurality of pixel electrodes 20 corresponding to the plurality of pixels PX existing in the rectangular region. For example, each common electrode 30 is formed in a rectangular shape corresponding to several tens of pixels PX.

Liquid crystal display device 1 according to the present exemplary embodiment is a liquid crystal display panel having a touch sensing function based on a self-capacitive capacitance method. Therefore, common electrode 30 is also a touch electrode that forms a capacitance with pixel electrode 20. That is, common electrode 30 is paired with pixel electrode 20 and is used not only at the time of image display driving but is also used at the time of touch position detection driving. Each common electrode 30 is a unit electrode (touch electrode) for detecting a touch position. As described above, in the touch position detection driving, common electrodes 30 are configured as a plurality of touch electrodes each provided facing one or more pixel electrodes 20 and away from each other.

A size of one common electrode 30 is, for example, 40×40 pixels. That is, the length in each of the row direction and the column direction of one common electrode 30 is the length of 40 pixels. In this case, there are 40 contact portions with one touch line 60 in one common electrode 30. Note that the size of one common electrode 30 is not limited to this but may be 32×32 pixels. Further, the shape of one common electrode 30 is not limited to a square but may be a rectangle.

Common electrodes 30 are separated from each other using at least one of a region above gate line 40 and a region above data line 50 as a separation region. In the present exemplary embodiment, common electrodes 30 are arranged in a matrix, and are separated from each other using both the region above gate line 40 and the region above data line 50 as the separation regions.

As shown in FIG. 3, two common electrodes 30 adjacent in the column direction are separated from each other with a region above gate line 40 as first separation region SA1. That is, two common electrodes 30 adjacent in the column direction are divided with first separation region SA1 as a boundary, and do not face gate line 40 in first separation region SA1. First separation region SA1 that separates common electrode 30 in the column direction is a touch-electrode boundary and extends along the row direction.

Further, two common electrodes 30 adjacent in the row direction are separated from each other with a region above data line 50 as second separation region SA2. That is, two common electrodes 30 adjacent in the row direction are divided with second separation region SA2 as a boundary, and do not face data line 50 in second separation region SA2. Second separation region SA2 that separates common electrode 30 in the row direction is a touch-electrode boundary and extends along the column direction.

Gate line 40 extending in the row direction supplies a gate signal to transistor 10 in pixel PX. Gate line 40 is provided at a boundary between two pixels PX adjacent in the column direction in the image display region 1a. Specifically, gate line 40 is provided between two pixel columns adjacent in the column direction.

Gate line 40 is connected to transistors 10 of pixels PX arranged in the row direction. That is, gate line 40 is connected to one transistor 10 in each pixel PX. Specifically, gate line 40 is connected to gate electrode 10G of each transistor 10.

One of the plurality of gate lines 40 is provided for each boundary between two pixels PX adjacent in the column direction. That is, liquid crystal display device 1 according to the present exemplary embodiment has a single gate structure, and one gate line 40 is provided at each boundary between the two pixel columns adjacent in the column direction. Thus, one gate line 40 exists in first separation region SA1 between two common electrodes 30 adjacent in the column direction. Note that liquid crystal display device 1 is not limited to the single gate structure, but may have a dual-gate structure. In this case, two of the plurality of gate lines 40 are provided at each boundary between two pixels PX adjacent in the column direction.

Similarly to data lines 50, gate lead line 41 extending in the column direction are provided at the boundary between two pixels PX adjacent in the row direction in the image display region 1a. Specifically, gate lead line 41 is provided between the two pixel columns adjacent in the row direction.

Gate lead lines 41 supplies a gate signal that is output from gate driver 5 to gate line 40 corresponding to gate lead line 41. That is, gate lead line 41 is a relay wire for supplying the gate signal that is output from gate driver 5 to gate line 40 as a relay line. Therefore, gate lead line 41 is connected to gate line 40 at at least one of a plurality of intersections between gate lines 40 and gate lead lines 41. That is, gate line 40 is electrically connected to one or more gate lead lines 41. Specifically, gate line 40 and gate lead line 41 are connected at at least one of a plurality of three-dimensional intersections of gate lines 40 and gate lead lines 41 in the image display region 1a via a gate contact hole.

For example, one gate line 40 and one gate lead line 41 are connected in one location. Thus, each gate line 40 is connected to one gate lead line 41 in one gate contact hole. Note that one gate line 40 may be connected to two or more gate lead lines 41. In this case, one gate line 40 is connected to a plurality of gate lead lines 41 at a plurality of gate contact holes.

As described above, in liquid crystal display device 1 according to the present exemplary embodiment, gate line 40 that is a lateral gate line extending in the row direction and a gate lead line 41 that is a vertical gate line extending in the column direction are each provided as a wire for the gate signal that is output from gate driver 5.

Data line 50 extending in the column direction supplies a data signal (video signal) to transistor 10 in pixel PX. Data lines 50 is provided at a boundary between two pixels PX adjacent in the row direction in the image display region 1a. Specifically, one data line 50 is provided between the two pixel columns adjacent in the row direction.

Data line 50 is connected to transistors 10 of pixels PX arranged in the column direction. That is, data line 50 is connected to one transistor 10 in each pixel PX. Specifically, data line 50 is connected to drain electrode 10D of transistor 10. That is, in the present exemplary embodiment, data line 50 is a drain line.

Touch line 60 extending along the column direction is provided at a boundary between two pixels PX adjacent in the row direction in the image display region 1a, similarly to data line 50. Specifically, touch line 60 is provided between two pixel columns adjacent in the row direction.

As shown in FIG. 3, touch lines 60 are connected one-by-one to common electrodes 30 arranged in the column direction. Specifically, touch lines 60 (column touch line group) in each column of common electrodes 30 arranged in the column direction is provided so as to traverse all of the common electrodes 30 included in the column. However, each touch line 60 is connected to only one of the common electrodes 30 included in the column. Therefore, each common electrode 30 is connected to any one of touch lines 60 traversing common electrode 30, but is not connected to and is insulated from the other remaining touch lines 60. The number of touch lines 60 straddling the common electrodes 30 arranged in the column direction may only be the same as that of the common electrodes 30 arranged in the column direction.

Touch line 60 and common electrode 30 are formed via an insulating film, and touch line 60 and common electrode 30 corresponding to touch line 60 are connected through a contact hole formed in the insulating film. This contact hole becomes a contact portion that connects touch line 60 and common electrode 30.

dummy touch lines that do not contribute to the detection of the touch position may be provided. The dummy touch line is not connected to common electrode 30. When the dummy touch lines are provided, for example, touch lines 60 and the dummy touch lines may be alternately arranged for each pixel. A predetermined voltage such as a common voltage (Vcom) or a gate-to-off voltage (Vgoff) similar to common electrode 30 may be applied to the dummy touch line, or a predetermined voltage may not be applied. That is, the dummy touch line may be floating lines.

As shown in FIG. 1, liquid crystal display device 1 includes gate driver 5 and source driver 6 in order to display an image corresponding to an input video signal. Gate driver 5 and source driver 6 are driver Integrated circuits (ICs) (IC packages), for example.

Gate driver 5 and source driver 6 are mounted in frame region 1b of liquid crystal display device 1. Specifically, gate driver 5 and source driver 6 are mounted at the end of liquid crystal display device 1 by a chip-on-film (COF) method or a chip-on-glass (COG) method.

When gate driver 5 and source driver 6 are mounted by the COF method, a COF made of an anisotropic conductive film (ACF), in which gate driver 5 or source driver 6 is mounted on a flexible wiring board such as a flexible flat cable (FFC) or a flexible printed cable (FPC), is connected to an electrode terminal provided at an end of liquid crystal display device 1 by thermal press fitting.

On the other hand, when gate driver 5 and source driver 6 are mounted by the COG method, gate driver 5 and source driver 6 are directly mounted on an active matrix substrate of liquid crystal display device 1.

Note that both gate driver 5 and source driver 6 are not limited to be mounted by the COF method or the COG method, and one of gate driver 5 and source driver 6 may be mounted by the COF method and the other may be mounted by the COG method.

As shown in FIG. 2, gate driver 5 is electrically connected to gate line 40. In the present exemplary embodiment, gate driver 5 is electrically connected to gate line 40 via gate lead line 41. Gate driver 5 selects pixel PX where a data signal is to be written in accordance with a timing signal input from image processing unit 4, and supplies a gate line 40 with a voltage (gate-on voltage; Vgon) for turning on transistor 10 of the selected pixel PX. Thereby, a data voltage is supplied to pixel electrode 20 of the selected pixel PX via transistor 10.

Source driver 6 is connected to data line 50 of liquid crystal display device 1. Source driver 6 supplies a voltage (data voltage) corresponding to a video signal input from image processing unit 4 to data line 50 in accordance with the selection of gate line 40 by gate driver 5.

In the present exemplary embodiment, a source driver with a touch function is used as source driver 6. The source driver with a touch function is a driver in which an image display circuit necessary for performing image display driving and a touch position detection circuit necessary for performing touch position detection driving are shared. In the present exemplary embodiment, the plurality of data lines 50 and the plurality of touch lines 60 are connected to source driver 6 that is a source driver with a touch function. Further, by using touch line 60 as a common line, the source driver with a touch function supplies a common voltage (Vcom) to common electrode 30 via the common line.

Gate driver 5 and source driver 6 are mounted on one of a pair of sides in frame region 1b. That is, gate driver 5 and source driver 6 are provided on the same side of frame region 1b. Specifically, gate driver 5 and source driver 6 are mounted at the end of liquid crystal display device 1 on the column-direction side. The mounting locations of gate driver 5 and source driver 6 are not limited to this, and gate driver 5 and source driver 6 may be mounted on different sides of frame region 1b.

As shown in FIG. 1, backlight 3 is disposed on the back surface side of liquid crystal display device 1 and irradiates liquid crystal display device 1 with light. In the present exemplary embodiment, backlight 3 is a light-emitting diode (LED) backlight including an LED as a light source, but is not limited to this. Backlight 3 is a direct type LED backlight in which LEDs are two-dimensionally arranged on a substrate so as to face liquid crystal display device 1, but may be an edge type backlight. Backlight 3 is a surface emitting unit that applies flat and uniform scattered light (diffused light). Backlight 3 may have an optical member such as a diffusion plate (diffusion sheet) in order to diffuse light from the light source.

Image processing unit 4 is a control device that includes an arithmetic processing circuit such as a central processing unit (CPU) and a memory such as a read-only memory (ROM) and a random-access memory (RAM). Video data to be displayed on liquid crystal display device 1 is input into image processing unit 4. In image processing unit 4, the CPU reads out and executes a program stored in the memory, thereby executing various processes. Specifically, image processing unit 4 includes a timing controller or the like that performs various image signal processing, such as color adjustment, on video data input from an external system (not shown) and generates a video signal indicating a gradation value of each pixel PX and a timing signal indicating the timing for writing the video signal into each pixel PX. Image processing unit 4 outputs the video signal to source driver 6 and outputs the timing signal to gate driver 5.

Liquid crystal display device 1 according to the present exemplary embodiment has a display function and a touch function. That is, liquid crystal display device 1 performs image display driving and touch position detection driving. In this case, liquid crystal display device 1 uses touch line 60 to perform image display driving and touch position detection driving by time division. For example, as shown in FIGS. 4A and 4B, image display driving and touch position detection driving are alternately repeated a plurality of times within one frame period (16.6 ms). In this case, the touch position detection driving can be performed using, for example, a blanking period.

When liquid crystal display device 1 performs the image display driving, the gate-on voltage from gate driver 5 is supplied to gate line 40 via gate lead line 41. Thereby, transistor 10 of the selected pixel PX is turned on, and the data voltage is supplied to pixel electrode 20 from data line 50 connected to transistor 10. An electric field is generated in the liquid crystal layer due to the difference between the data voltage supplied to pixel electrode 20 and the common voltage supplied to common electrode 30. This electric field changes an alignment state of liquid crystal molecules in the liquid crystal layer in each pixel PX, and the light transmittance of backlight 3 passing through liquid crystal display device 1 is controlled for each pixel PX. Thereby, a desired image is displayed in image display region 1a of liquid crystal display device 1.

Further, when liquid crystal display device 1 performs the touch position detection driving, source driver 6 which is a source driver with a touch function detects a change in capacitance of each of the plurality of common electrodes 30 as a touch detection signal via touch line 60. Thereby, common electrode 30 at the touched position can be specified, and the position touched by the user can be detected.

Note that the control shown in FIG. 4B has a long driving period per image display driving and touch position detection driving as compared to the control shown in FIG. 4A. In the present exemplary embodiment, either the control shown in FIG. 4B or the control shown in FIG. 4A may be used. However, as compared to the control in FIG. 4A, in the control shown in FIG. 4B, the amount of image data stored into the memory during the touch position detection driving increases, and hence the chip size of the IC driver increases.

Figure 5:
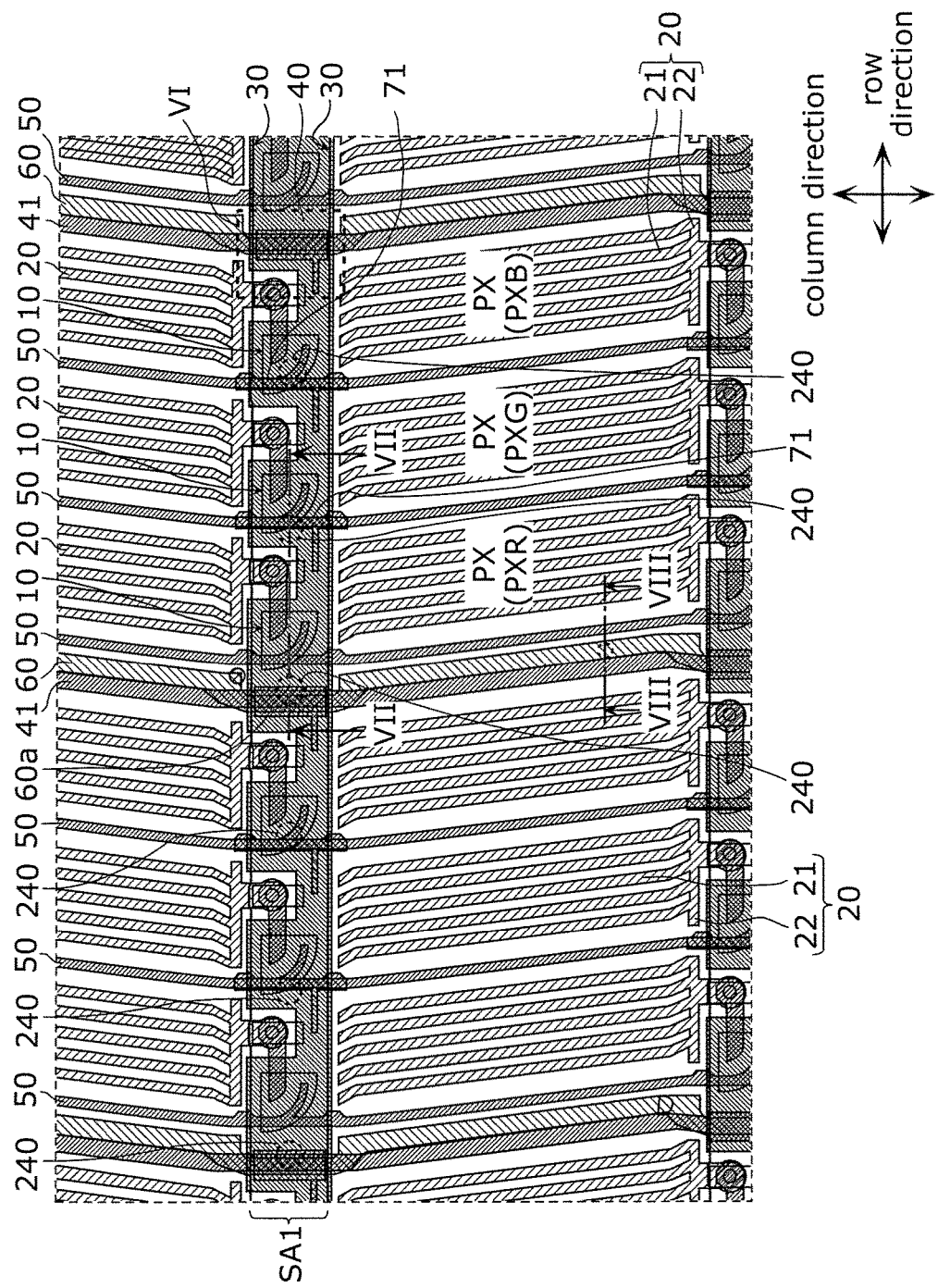
FIG. 5 is a planar view showing an example of a configuration of pixels in the liquid crystal display device according to the exemplary embodiment.
Figure 6:
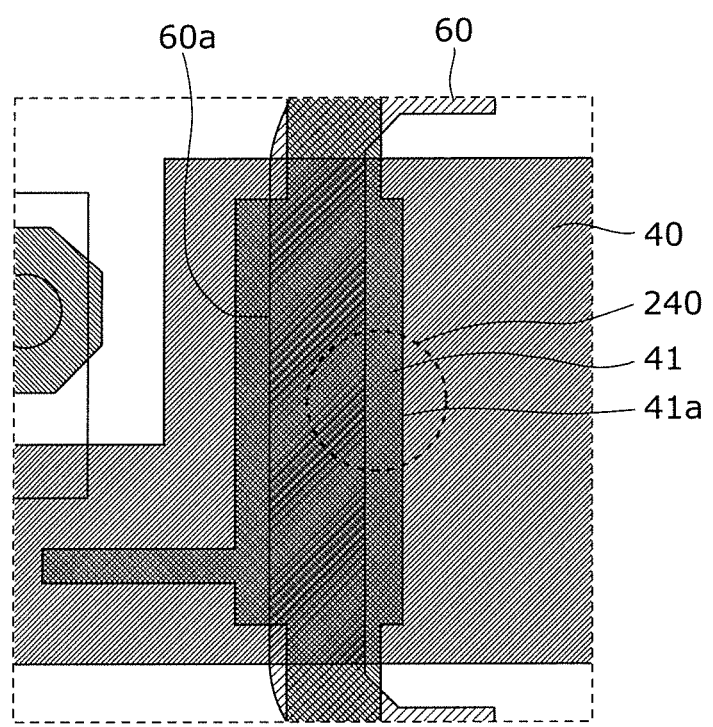
FIG. 6 is an enlarged view of a region VI surrounded by a broken line in FIG. 5.

Next, an example of the pixel configuration of liquid crystal display device 1 will be described with reference to FIGS. 5 and 6. FIG. 5 is a planar view showing an example of the configuration of pixel PX in liquid crystal display device 1 according to the exemplary embodiment. FIG. 6 is an enlarged view of a region VI surrounded by a broken line in FIG. 5.

As shown in FIG. 5, pixel PX is provided with one transistor 10 and one pixel electrode 20.

Pixel electrode 20 has a plurality of slits, and has a plurality of line electrodes extending in a stripe shape in the column direction. Each of the plurality of line electrodes has a strip shape, and a plurality of slits extending in the column direction are formed in pixel electrode 20 to form a stripe shape. In each pixel electrode 20, all the line electrodes 21 are formed substantially in parallel, and an interval (slit width) between two adjacent line electrodes 21 is constant. Further, in each pixel electrode 20, the intervals of all the line electrodes 21 are the same. In each pixel PX, one ends in the longitudinal direction of the plurality of line electrodes 21 are coupled by a coupling electrode 22 extending along the row direction. That is, pixel electrode 20 in the present exemplary embodiment has a comb shape.

Line electrode 21 is inclined with respect to the row direction or the column direction in each pixel PX. In this case, in the present exemplary embodiment, the direction of the line electrode 21 is inverted between two pixels PX adjacent in the column direction, and the line electrodes 21 are formed to have a substantially "<" shape in two columns in the column direction. That is, the plurality of pixel electrodes 20 arranged in the column direction are formed to have a zigzag shape along the column direction. Note that line electrode 21 may be formed in parallel to the row direction or the column direction without being inclined.

Gate line 40 extends linearly in the row direction. One gate line 40 is provided at the boundary between two pixels PX adjacent in the column direction. That is, gate line 40 is provided for each pixel PX.

Similarly to data lines 50, gate lead line 41 extends in the column direction along the shape of line electrode 21 of pixel electrode 20. Specifically, each gate lead line 41 is inverted in direction by two pixels PX adjacent in the column direction, and is formed so as to have a substantially "<" shape for the two pixels in the column direction. That is, gate lead line 41 is formed so as to have a zigzag shape along the column direction. Note that gate lead line 41 may extend linearly in the column direction.

One gate lead line 41 is provided for every three pixels of red pixel PXR, green pixel PXG, and blue pixel PXB. In the present exemplary embodiment, gate lead line 41 is provided in a region (V region) between red pixel PXR and blue pixel PXB.

In the present exemplary embodiment, gate lead line 41 and data line 50 are formed in the same layer. Further, gate lead line 41 and data line 50 are orthogonal to gate line 40. Accordingly, gate lead line 41 and data line 50 three-dimensionally intersect gate line 40 via the insulating film.

Data line 50 extends in the column direction along the shape of line electrode 21 of pixel electrode 20. Specifically, data line 50 is inverted in direction by two pixels PX adjacent in the column direction, and is formed to have a substantially "<" shape for two pixels in the column direction. That is, data line 50 is formed to have a zigzag shape along the column direction. Note that gate line 40 may extend linearly in the column direction.

Similarly to data line 50, touch line 60 extends in the column direction along the shape of the line electrode 21 of pixel electrode 20. Specifically, touch line 60 is inverted in direction by two pixels PX adjacent in the column direction, and is formed to have a substantially "<" shape for two pixels in the column direction. That is, touch line 60 is formed to have a zigzag shape along the column direction. Note that touch line 60 may extend linearly in the column direction.

Similarly to gate lead line 41, one touch line 60 is provided for every three pixels of red pixel PXR, green pixel PXG, and blue pixel PXB. In the present exemplary embodiment, similarly to gate lead line 41, touch line 60 is provided in a region (V region) between red pixel PXR and blue pixel PXB. That is, touch line 60, gate lead line 41, and data line 50 are provided in the region between red pixel PXR and blue pixel PXB. Specifically, the gate lead line 41 and data line 50 are provided so as to sandwich touch line 60. Note that the arrangement order of touch line 60, gate lead line 41, and data line 50 between one pixel is not limited to this.

As shown in FIGS. 5 and 6, touch line 60 and gate lead line 41 partially overlap in the planar view. In the present exemplary embodiment, touch line 60 overlaps gate lead line 41 at least above gate line 40.

Specifically, the three wires of touch line 60, gate lead line 41, and data line 50 extend in parallel between two gate lines 40 adjacent in the column direction, but above gate line 40, only touch line 60 among the three lines of touch line 60, gate lead line 41 and data line 50 is bent and overlaps gate lead line 41. That is, touch line 60 has bent portion 60a that is partially bent so as to overlap gate lead line 41. In the present exemplary embodiment, with touch line 60 being formed in a layer higher than gate lead line 41, touch line 60 is bent so as to ride on gate lead line 41. Since touch line 60 and gate lead line 41 partially overlap, touch line 60 and gate lead line 41 are laminated partially.

The ratio of overlapping between touch line 60 and gate lead line 41 is preferably larger in a portion of touch line 60 that overlaps gate line 40 than in a portion located between two gate lines 40 adjacent in the column direction. In other words, the ratio of touch line 60 overlapping gate lead line 41 is preferably larger in a portion above gate line 40 than in a portion located between two gate lines 40 adjacent in the column direction. In the present exemplary embodiment, touch line 60 and gate lead line 41 overlap almost only on gate line 40, and almost do not overlap between two gate lines 40 adjacent in the column direction.

Although details will be described later, spacer 240 is disposed facing the portion where touch line 60 and gate lead line 41 overlap. Specifically, spacer 240 is provided at a position facing bent portion 60a in touch line 60. In the present exemplary embodiment, spacer 240 includes first spacer 241 and second spacer 242, and first spacer 241 faces the portion where touch line 60 and gate lead line 41 overlap.

Further, as shown in FIG. 6, gate lead line 41 has a wide portion 41a with a larger width at a portion overlapping touch line 60. That is, the gate lead line 41 has a partially larger width at bent portion 60a of touch line 60. In the present exemplary embodiment, the wide portion 41a of gate lead line 41 protrudes from both sides of touch line 60. In other words, in the portion where gate lead line 41 and touch line 60 overlap, touch line 60 is located above gate lead line 41 so as not to protrude from gate lead line 41. Thus, in the portion where gate lead line 41 and touch line 60 overlap, the width of touch line 60 is smaller than the width of gate lead line 41, and both ends of touch line 60 in the width direction are located on the inner side of both ends of gate lead line 41 in the width direction.

Moreover, as described above, two common electrodes 30 adjacent in the column direction are separated from each other with a region above gate line 40 as first separation region SA1. As shown in FIG. 5, first bridge portion 71 is provided in first separation region SA1. First bridge portion 71 is a linear bridge line that crosses over two common electrodes 30 that are adjacent in the column direction across one first separation region SA1. That is, first bridge portion 71 is formed over one common electrode 30 of two common electrodes 30 that are adjacent in the column direction across gate line 40 and the other common electrode 30 of two common electrodes 30 that adjacent in the column direction.

In the present exemplary embodiment, first bridge portion 71 is formed so as to overlap data line 50 in the planar view. Specifically, first bridge portion 71 is formed above data line 50 along data line 50. Note that the width of first bridge portion 71 and the width of data line 50 are substantially the same.

Further, first bridge portion 71 is formed in a layer different from common electrode 30. In the present exemplary embodiment, first bridge portion 71 is formed in the same layer as touch line 60, and an insulating film is formed between first bridge portion 71 and common electrode 30. However, two common electrodes 30 adjacent in the column direction are not connected by first bridge portion 71. Specifically, no contact hole is formed in the insulating film between first bridge portion 71 and common electrode 30, and first bridge portion 71 and common electrode 30 are not connected.

Note that second spacer 242 faces first bridge portion 71. That is, second spacer 242 is disposed so as to face first bridge portion 71.

As shown in FIG. 6, touch line 60 is electrically connected with common electrode 30 via contact hole 124a. Contact hole 124a is formed in an insulating film formed between touch line 60 and common electrode 30. As will be described in detail later, the insulating film formed between touch line 60 and common electrode 30 is fourth insulating film 124.

Contact hole 124a is formed so as to partially overlap touch line 60 in the planar view. Specifically, contact hole 124a protrudes from touch line 60 in the planar view. In the present exemplary embodiment, only one of both ends of touch line 60 in the width direction in contact hole 124a protrudes from touch line 60. As an example, contact hole 124a is formed such that about ¼ to ½ of contact hole 124a overlaps touch line 60.

In FIG. 6, contact hole 124a partially overlaps the corner of the bent portion of touch line 60, and about ¼ of contact hole 124a overlaps touch line 60.

Figure 7:
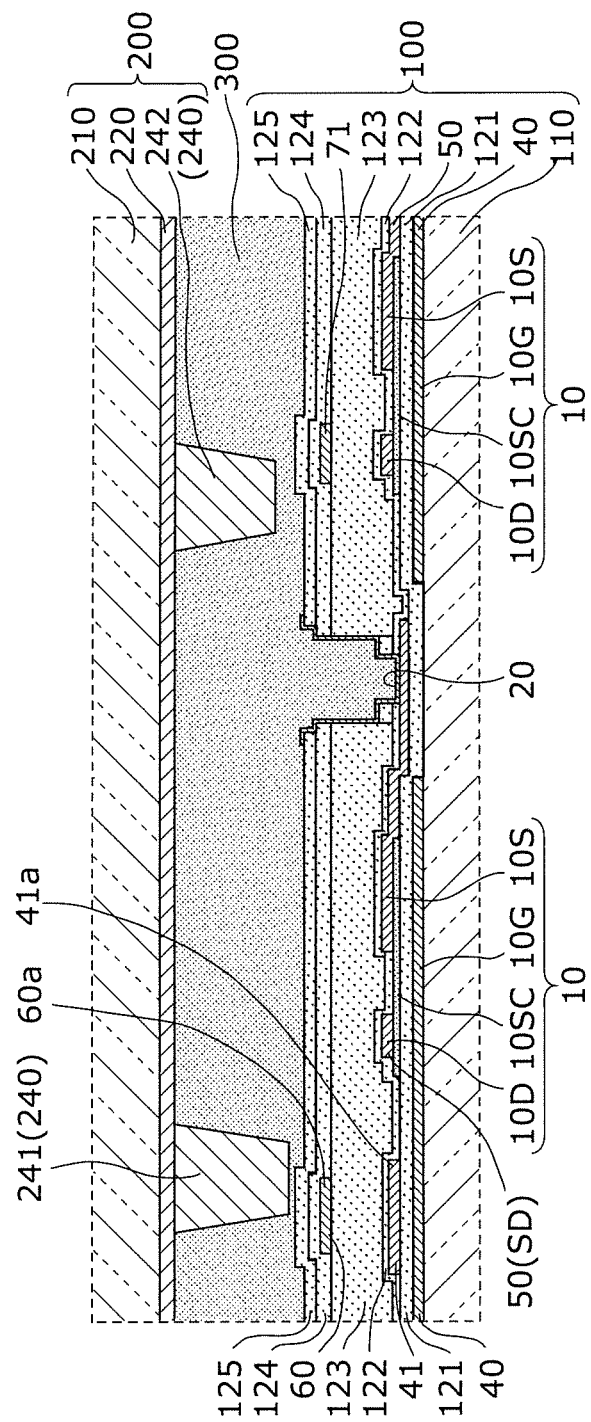
FIG. 7 is a cross-sectional view of the liquid crystal display device according to the exemplary embodiment taken along line VII-VII in FIG. 5.
Figure 8:
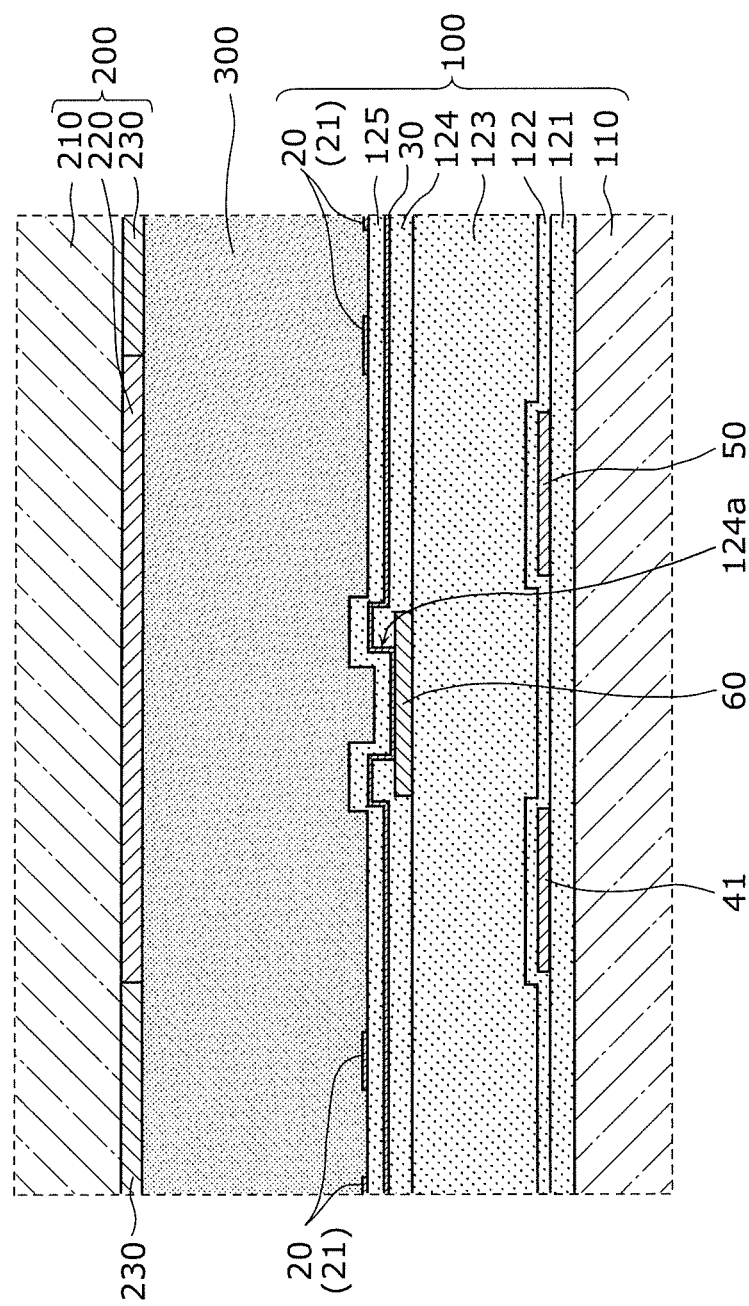
FIG. 8 is a cross-sectional view of the liquid crystal display device according to the exemplary embodiment taken along line VIII-VIII in FIG. 5.

Next, a cross-sectional structure of liquid crystal display device 1 will be described with reference to FIGS. 7 and 8 while referring to FIGS. 5 and 6. FIG. 7 is a cross-sectional view of liquid crystal display device 1 taken along line VII-VII in FIG. 5. FIG. 8 is a cross-sectional view of liquid crystal display device 1 taken along line VIII-VIII in FIG. 5.

As shown in FIGS. 7 and 8, liquid crystal display device 1 includes first substrate 100, second substrate 200 facing first substrate 100, and liquid crystal layer 300 disposed between first substrate 100 and second substrate 200. In the present exemplary embodiment, first substrate 100 is located on the backlight 3 side, and second substrate 200 is located on the observer side. Although not shown, liquid crystal layer 300 is sealed between first substrate 100 and second substrate 200 by a frame-shaped sealing member.

First substrate 100 is a TFT substrate having a TFT as transistor 10. Specifically, first substrate 100 is an active matrix substrate in which a plurality of transistors 10 are arranged in a matrix. First substrate 100 includes not only transistor 10 but also various wires such as gate line 40, gate lead line 41, data line 50, and touch line 60, an insulating film that insulates the wires, pixel electrode 20, common electrode 30, alignment film 126 and the like. These members are formed on first transparent substrate 110. First transparent substrate 110 is a transparent substrate such as a glass substrate, for example.

As shown in FIG. 7, transistor 10 formed on first transparent substrate 110 includes gate electrode 10G, source electrode 10S, drain electrode 10D, and semiconductor layer 10SC serving as a channel layer. In the present exemplary embodiment, transistor 10 is a TFT having a bottom gate structure, and includes gate electrode 10G formed on first transparent substrate 110, first insulating film 121 that is a gate insulator (GI) formed on gate electrode 10G, and semiconductor layer 10SC formed above gate electrode 10G via first insulating film 121. Source electrode 10S and drain electrode 10D are formed so as to cover a part of semiconductor layer 10SC. First insulating film 121 is formed over the entire surface of first transparent substrate 110 so as to cover gate electrode 10G.

For example, gate electrode 10G may be made of a metal film having a two-layer structure of a molybdenum film and a copper film, or may be made of a single-layer metal film made of a copper film or the like. First insulating film 121 may be made up of, for example, an insulating film having a two-layer structure of a silicon oxide film and a silicon nitride film, or may be made up of a single insulating film of a silicon oxide film or a silicon nitride film. For example, semiconductor layer 10SC may be made up of a semiconductor film having a two-layer structure of an i-amorphous silicon film and an n-amorphous silicon film, or may be made up of a semiconductor film having only one layer of the i-amorphous silicon film. For example, source electrode 10S and drain electrode 10D may be formed of a metal film having a two-layer structure of a molybdenum film and a copper film, or may be formed of a single metal film made of a copper film or the like.

Note that the materials of gate electrode 10G, source electrode 10S, drain electrode 10D, semiconductor layer 10SC, and first insulating film 121 are not limited to these. For example, as a material of semiconductor layer 10SC, an In—Ga—Zn—O-based oxide semiconductor or the like may be used.

As shown in FIGS. 7 and 8, gate line 40, gate lead line 41 and data line 50 are formed on first substrate 100. Gate line 40, gate lead line 41 and data line 50 are formed on first transparent substrate 110.

Gate line 40 is formed in the same layer as gate electrode 10G. That is, gate line 40 and gate electrode 10G are formed by patterning the same metal film. Gate line 40 and gate electrode 10G are formed in a first wiring layer (GAL layer) that is a metal layer.

Data line 50 is formed in the same layer as source electrode 10S and drain electrode 10D. That is, data line 50, source electrode 10S, and drain electrode 10D are formed by patterning the same metal film. Data line 50, source electrode 10S, and drain electrode 10D are formed in a second wiring layer (SD layer) that is a metal layer on the first wiring layer.

Gate lead line 41 is formed in the same layer as data line 50. That is, gate lead line 41 is formed in the SD layer, and gate lead line 41, data line 50, source electrode 10S, and drain electrode 10D are formed by patterning the same metal layer.

A first insulating film 121 is formed as a first insulating layer (GI layer) between the first wiring layer (GAL layer) and the second wiring layer (SD layer). First insulating film 121 is formed over the entire surface of first transparent substrate 110 so as to cover gate line 40 and gate electrode 10G. The first wiring layer, first insulating film 121, and the second wiring layer are TFT layers where transistor 10 which is a TFT is formed.

Note that source electrode 10S of transistor 10 is connected to pixel electrode 20 through a contact hole. Meanwhile, drain electrode 10D of transistor 10 is connected to data line 50. Specifically, a part of data line 50 is drain electrode 10D.

On first insulating film 121, second insulating film 122 is formed as a second insulating layer (PAS layer) so as to cover data line 50 and the source and drain electrodes of transistor 10. That is, data line 50 and the source and drain electrodes of transistor 10 are formed between first insulating film 121 and second insulating film 122. Second insulating film 122 is formed over the entire surface of first insulating film 121. Second insulating film 122 is configured of an inorganic insulating film made of an inorganic material such as a silicon nitride film, for example. Second insulating film 122, which is an inorganic insulating film, can be formed by, for example, a chemical vapor deposition (CVD) method.

Further, on second insulating film 122, third insulating film 123 is formed as a third insulating layer (OPAS layer). Third insulating film 123 is formed over the entire surface of second insulating film 122. In the present exemplary embodiment, a thickness of third insulating film 123 is larger than a thickness of second insulating film 122. Specifically, the thickness of third insulating film 123 is 10 times or more the thickness of second insulating film 122, and is 3000 nm as an example. Thereby, the distance in the thickness direction between the wire such as gate line 40 and data line 50 and common electrode 30 can be increased, so that a parasitic capacitance formed by the wire such as gate line 40 and data line 50 and common electrode 30 can be reduced. In addition, by increasing the thickness of third insulating film 123, the irregularities of the TFT layer caused by forming transistor 10, gate line 40, and data line 50 can be reduced, to planarize the TFT layer. As a result, third insulating film 123 having a planarized surface can be formed, so that common electrode 30 immediately above third insulating film 123 can be formed in a flat planar shape. That is, third insulating film 123 functions as a planarized layer.

Third insulating film 123 is configured of an organic insulating film made of an organic material containing carbon. Third insulating film 123, which is an organic insulating film, can be formed, for example, by applying and curing a liquid organic material. Thus, third insulating film 123 can be easily thickened, and the surface of third insulating film 123 can be easily planarized over all pixels PX.

Touch line 60 is formed on third insulating film 123. Touch line 60 is made of a low-resistance material such as metal. For example, touch line 60 is a metal film made of copper or the like. In the present exemplary embodiment, the touch line 60 is a copper wire made of a copper film. Touch line 60 is formed in a third wiring layer (CMT layer) that is a metal layer on the second wiring layer. Hence touch line 60 is provided in a different layer from gate line 40 and data line 50.

Further, as shown in FIG. 7, first bridge portion 71 is formed in the same layer as a layer (CMT layer) where touch line 60 is formed. That is, first bridge portion 71 is formed in a third wiring layer (CMT layer) like touch line 60, and touch line 60 and first bridge portion 71 are formed by patterning the same metal film. Therefore, first bridge portion 71 is a copper wire made of a copper film. Note that first bridge portion 71 is formed in an island shape and is not connected anywhere.

On third insulating film 123 and touch line 60, fourth insulating film 124 is formed as a fourth insulating layer (TPS layer). Accordingly, touch line 60 is formed between third insulating film 123 and fourth insulating film 124. Fourth insulating film 124 is formed over the entire surface of third insulating film 123 so as to cover touch line 60. For example, an inorganic insulating film made of an inorganic material such as a silicon nitride film constitutes fourth insulating film 124.

On fourth insulating film 124, common electrode 30 is formed. Common electrode 30 is a transparent electrode made of a transparent metal oxide such as indium tin oxide (ITO). In the present exemplary embodiment, common electrode 30 is an ITO film. Common electrode 30 is formed in the fourth wiring layer (MIT layer) above the third wiring layer.

As described above, a plurality of common electrodes 30 are formed. Specifically, as shown in FIG. 3, the common electrodes 30 are arranged in a matrix in a state of being separated from each other in the row direction and the column direction.

Further, the plurality of common electrodes 30 are formed over all the pixels PX in the image display region 1*a*. Thereby, the wiring of gate line 40, data line 50, and the like is covered by common electrode 30, so that the electric field generated in the wiring of gate line 40, data line 50, and the like can be shielded by common electrode 30. That is, the electric field generated in the TFT layer can be shielded by common electrode 30. Accordingly, the flexibility in designing the shape and size of pixel electrode 20 formed on common electrode 30 is improved, thereby facilitating improvement in light transmittance and the aperture ratio of pixel PX.

As shown in FIG. 8, common electrode 30 is connected to one touch line 60 through contact hole 124*a* formed in fourth insulating film 124. Thereby, at the time of performing the touch position detection driving, a change in capacitance of common electrode 30 at the position touched by the user can be detected via touch line 60 connected to common electrode 30.

In addition, although the ITO film has a relatively high resistance value, the resistance of common electrode 30 made of the ITO film can be reduced by connecting the touch line 60 made of a low-resistance metal film to common electrode 30, whereby a time constant of common electrode 30 can be lowered. That is, at the time of performing image display driving, touch line 60 can be used as a common line.

Furthermore, by providing common electrode 30 on touch line 60, touch line 60 can be covered with common electrode 30. Thereby, as compared to a case where the touch line 60 is provided on common electrode 30, corrosion of the touch line 60 made of a metal material that is easily corroded can be prevented.

On fourth insulating film 124 and common electrode 30, fifth insulating film 125 is formed as a fifth insulating layer (UPS layer). Fifth insulating film 125 is formed over the entire surface of fourth insulating film 124 so as to cover common electrode 30. Fifth insulating film 125 is made of an inorganic insulating film made of an inorganic material such as a silicon nitride film, for example.

As described above, contact hole 124*a* is formed so as to partially overlap touch line 60 in the planar view (cf. FIG. 6). Accordingly, as shown in FIG. 8, contact hole 124*a* is formed across an end of touch line 60. Therefore, steps are formed in common electrode 30 and fifth insulating film 125 formed on contact hole 124*a*.

In the present exemplary embodiment, as shown in FIG. 6, contact hole 124*a* partially overlaps the corner of the bent portion of touch line 60. As a result, steps are formed on the two respective sides of the right-angled corner of touch line 60. Therefore, the steps are formed in two directions.

On fifth insulating film 125, pixel electrode 20 is formed. Pixel electrode 20 faces common electrode 30 with fifth insulating film 125 placed therebetween. That is, pixel electrode 20 is formed on common electrode 30. Pixel electrode 20 is a transparent electrode made of a transparent metal oxide such as indium tin oxide. In the present exemplary embodiment, pixel electrode 20 is an indium tin oxide (ITO) film like common electrode 30. Pixel electrode 20 is formed in a fifth wiring layer (PIT layer) on the fourth wiring layer.

Alignment film 126 is formed on pixel electrode 20. Alignment film 126 is formed on fifth insulating film 125 so as to cover pixel electrode 20 above first transparent substrate 110. Specifically, alignment film 126 is formed over all the pixels PIX. Alignment film 126 is in contact with liquid crystal layer 300 and controls initial alignment angles of liquid crystal molecules in liquid crystal layer 300. In the present exemplary embodiment, alignment film 126 is subjected to a rubbing process so as to align the initial alignment angles of the liquid crystal molecules in a certain direction. Alignment film 126 is a resin film made of polyimide, for example.

Next, second substrate 200 will be described. Second substrate 200 is a counter substrate facing first substrate 100. As shown in FIGS. 7 and 8, second substrate 200 includes second transparent substrate 210, black matrix 220 formed on second transparent substrate 210, and color filter 230. Therefore, second substrate 200 is a color filter substrate (CF substrate) having color filter 230.

Similarly to first transparent substrate 110, second transparent substrate 210 is a transparent substrate such as a glass substrate, for example.

Black matrix 220 is a black light-shielding layer, and is made of carbon black, for example. Black matrix 220 is formed on the surface of the second transparent substrate 210 on the liquid crystal layer 300 side. Black matrix 220 is formed between two pixels adjacent in each of the row direction and the column direction. Therefore, black matrix 220 is formed so as to cover various wires arranged between the pixels. As an example, black matrix 220 is formed in a lattice shape as a whole.

Color filter 230 is formed for each of the plurality of pixels PX. Specifically, color filter 230 includes a red color filter, a blue color filter, and a green color filter corresponding to red pixel PXR, green pixel PXG, and blue pixel PXB, respectively. Each color filter is formed in a region between black matrices 220 (i.e., openings of black matrix 220).

Second substrate 200 includes a plurality of spacers 240. Each of the plurality of spacers 240 is formed on second transparent substrate 210 so as to protrude toward first substrate 100. The plurality of spacers 240 are columnar members for keeping a gap between first substrate 100 and second substrate 200 (cell gap) uniform. Providing the plurality of spacers 240 can easily keep the thickness of liquid crystal layer 300 uniform. As an example, each spacer 240 has a cylindrical trapezoidal shape, and the shapes of the upper end and the lower end in the planar view are circular. The tip of each spacer 240 may or may not be in contact with the surface of first substrate 100. The plurality of spacers 240 are arranged over the entire area of the image display region 1a to keep the gap between first substrate 100 and second substrate 200 uniform over the entire area of the image display region 1a.

Each spacer 240 is made of a resin material such as acrylic resin and can be elastically deformed. Thereby, even if irregularities exist on the surface of first substrate 100 and fluctuation in the cell gap has occurred, the tip of spacer 240 can be deformed following the irregularities on the surface of first substrate 100. Each spacer 240 can be formed in a predetermined shape by, for example, photolithography.

In the present exemplary embodiment, the plurality of spacers 240 include first spacers 241 and second spacers 242. As shown in FIG. 7, first spacers 241 and second spacers 242 have different heights. Specifically, first spacers 241 are higher than second spacers 242. Note that first spacers 241 and second spacers 242 having different heights can be formed using a halftone mask or two masks.

As shown in FIG. 5, first spacer 241 and second spacer 242 are provided at the boundary between two pixels PX adjacent in the column direction. Specifically, first spacer 241 and second spacer 242 are formed on gate line 40. That is, first spacer 241 and second spacer 242 overlap gate line 40 and black matrix 220 that covers gate line 40 in the planar view.

In the present exemplary embodiment, first spacer 241 is provided between the pixels where gate lead line 41 and touch line 60 are disposed. Specifically, first spacer 241 is provided at a position facing a portion where touch line 60 and gate lead line 41 overlap. That is, the portion where touch line 60 and gate lead line 41 overlap functions as a pedestal for first spacer 241.

As shown in FIGS. 6 and 7, first spacer 241 is disposed to be shifted from the center of the portion in the row direction, where touch line 60 and gate lead line 41 overlap (bent portion 60a of touch line 60). Specifically, first spacer 241 is disposed so as to be shifted from a center of a width of touch line 60 in the width direction. Note that a center of first spacer 241 and the center of the width of touch line 60 may coincide with each other.

Second spacer 242 is provided between the pixels where gate lead line 41 and touch line 60 are not disposed. Specifically, second spacer 242 is provided at a position facing first bridge portion 71 formed in an island shape. That is, first bridge portion 71 functions as a pedestal for second spacer 242.

As shown in FIG. 6, second spacer 242 is disposed so as to be shifted from a center of a width of first bridge portion 71. Specifically, second spacer 242 is disposed so as to be shifted from the center of the width of first bridge portion 71 in the width direction. Note that a center of second spacer 242 and the center of the width of first bridge portion 71 may coincide with each other.

A pair of polarizing plates (not shown) are bonded to liquid crystal display device 1 configured as described above. For example, one of the pair of polarizing plates is formed on the outer surface of first substrate 100, and the other of the pair of polarizing plates is formed on the outer surface of second substrate 200. The pair of polarizing plates are disposed so that the polarization directions are orthogonal to each other. A retardation plate may be bonded to the pair of polarizing plates.

Next, a function of liquid crystal display device 1 according to the present exemplary embodiment will be described including the background to the present disclosure.

On the first substrate being a TFT substrate, a plurality of transistors are formed, and a plurality of wires such as gate lines and data lines are formed so as to intersect each other. In particular, as in the liquid crystal display device in the present exemplary embodiment, when a touch function is provided and a gate driver and a data driver are provided on the same side, on the first substrate, touch lines for detecting a touch position are formed, and gate lead lines are also formed as relay wires for relaying the gate driver and the gate lines. In addition, an insulating film is formed on the first substrate to insulate various intersecting wires, and in the insulating film, contact holes are formed to connect the wires and the electrodes located in the upper and lower layers.

Thus, when a plurality of wires intersect or a contact hole is formed on the first substrate, the surface of the uppermost layer of the first substrate becomes uneven. In this case, like liquid crystal display device 1 according to the present exemplary embodiment, even when third insulating film 123 (OPAS) made of a thick organic film is provided, it is difficult to make the uppermost layer of first substrate 100 completely flat.

For this reason, when a plurality of spacers are provided on the second substrate opposite to the first substrate, even though the plurality of spacers are to be brought into contact with the first substrate, some spacers may not come into contact with the first substrate due to the irregularities on the surface of the uppermost layer of the first substrate. Alternatively, there is a case where a certain clearance is to be provided between each of the plurality of spacers and the first substrate without bringing the plurality of spacers into contact with the first substrate. However, in this case, when the surface of the uppermost layer of the first substrate has irregularities, it is difficult to make the clearance between each of the plurality of spaces and the first substrate uniform.

As described above, when the spacer is provided in the liquid crystal display device, it is not easy to keep a gap between the first substrate and the second substrate (cell gap) uniform.

Therefore, in liquid crystal display device 1 according to the present exemplary embodiment, touch line 60 and gate lead line 41 are partially overlapped using touch line 60 and gate lead line 41 extending in the column direction. That is, touch line 60 and gate lead line 41 are partially laminated. Specifically, in liquid crystal display device 1 according to the present exemplary embodiment, touch line 60 is laminated on gate lead line 41 by bending touch line 60.

With this configuration, the portion where touch line 60 and gate lead line 41 overlap is thicker than the other portions. That is, the portion where touch line 60 and gate lead line 41 overlap can be functioned as the pedestal for spacer 240. Thereby, the clearance between spacer 240 and first substrate 100 can be made uniform. Hence the gap between first substrate 100 and second substrate 200 (cell gap) can be easily kept uniform.

Furthermore, in the present exemplary embodiment, the structure serving as the pedestal for spacer 240 is formed using touch line 60 and gate lead line 41. Specifically, a part of touch line 60 is bent to overlap touch line 60 and gate lead line 41, and this overlapped part is used as a pedestal for spacer 240. As a result, the portion where touch line 60 and gate lead line 41 overlap can be formed only by changing the mask for patterning touch line 60. This eliminates the need to separately form a member only for the pedestal for spacer 240, so that the structure that becomes the pedestal for spacer 240 can be formed on first substrate 100 at a low cost.

In the present exemplary embodiment, touch line 60 has been bent to partially overlap touch line 60 and gate lead line 41, but gate lead line 41 may be bent instead of touch line 60 to partially overlap touch line 60 and gate lead line 41. Alternatively, both touch line 60 and gate lead line 41 may be bent in directions approaching each other to partially overlap touch line 60 and gate lead line 41. Further, touch line 60 and gate lead line 41 may be partially overlapped without bending touch line 60 and gate lead line 41. For example, the width of at least one of touch line 60 and gate lead line 41 may be partially increased or decreased to partially overlap touch line 60 and gate lead line 41.

In liquid crystal display device 1 according to the present exemplary embodiment, touch line 60 partially overlaps gate lead line 41 on at least gate line 40. In this case, the ratio of overlapping between touch line 60 and gate lead line 41 is larger in a portion of touch line 60 that overlaps gate line 40 than in a portion located between two gate lines 40 adjacent in the column direction.

With this configuration, even when gate lead line 41 to which the gate voltage is applied and touch line 60 are overlapped, the structure serving as the pedestal for spacer 240 can be formed without affecting the display performance.

In the liquid crystal display device (liquid crystal display panel), an alignment film is formed to cover the pixel electrode so that the liquid crystal molecules in the liquid crystal layer are initially aligned at a predetermined angle. The alignment film is formed into a film shape by applying an alignment film liquid (liquid alignment film material) and curing the spread alignment film liquid. For example, the alignment film liquid can be spread over the entire surface of the TFT substrate by dropping the alignment film liquid onto a plurality of locations on the TFT substrate by inkjet or the like.

At this time, in a liquid crystal display device that is a liquid crystal display device having touch lines, a contact hole is formed in an insulating film between the touch line and a common electrode in order to connect the touch line and the common electrode. However, due to the contact hole being located above a thick insulating film (third insulating film 123 in the present exemplary embodiment), when an alignment film liquid is applied, the alignment film liquid may remain at the edge near the contact hole connecting the touch line and the common electrode, and the alignment film liquid may become thick at the edge near the contact hole, or the alignment film liquid may not enter the contact hole. For this reason, the thickness of the alignment film becomes uneven near the contact hole, or the alignment film is not formed in the contact hole, making it impossible to initially align the liquid crystal molecules in the liquid crystal layer near the contact hole at a desired angle. As a result, display unevenness or light leakage occurs to cause a decrease in image quality.

Therefore, in liquid crystal display device 1 according to the present exemplary embodiment, contact hole 124a for connecting common electrode 30 and touch line 60 is formed so as to partially overlap touch line 60 in the planar view.

Thereby, steps are formed in common electrode 30 and fifth insulating film 125 formed across an end of contact hole 124a, and hence, when the alignment film liquid for forming alignment film 126 is applied to the surface of fifth insulating film 125, the alignment film liquid easily spreads by touching the steps. Thus, when the alignment film liquid is applied, the alignment film liquid can be prevented from remaining at the edge of contact hole 124a As a result, the alignment film liquid can be applied with a uniform film thickness at the edge of contact hole 124a, and the alignment film liquid can be easily introduced into contact hole 124a. Therefore, alignment film 126 having a uniform thickness can be formed, and alignment film 126 can be formed even on the inside of contact hole 124a. As a result, the liquid crystal molecules in the liquid crystal layer can be initially aligned at a desired angle even near contact hole 124a. Hence the occurrence of display unevenness or light leakage can be prevented, thus preventing a decrease in image quality.

In the present exemplary embodiment, as shown in FIG. 6, contact hole 124a partially overlaps the corner of the bent portion of touch line 60, so that steps are formed in two directions.

Thus, when the alignment film liquid is applied, the alignment film liquid touches the steps in the two directions, and hence the alignment film liquid spread easily. Therefore, the alignment film liquid can be applied with a more uniform film thickness, and the alignment film liquid can be more easily introduced into contact hole 124a.

Modification 1

Figure 9:
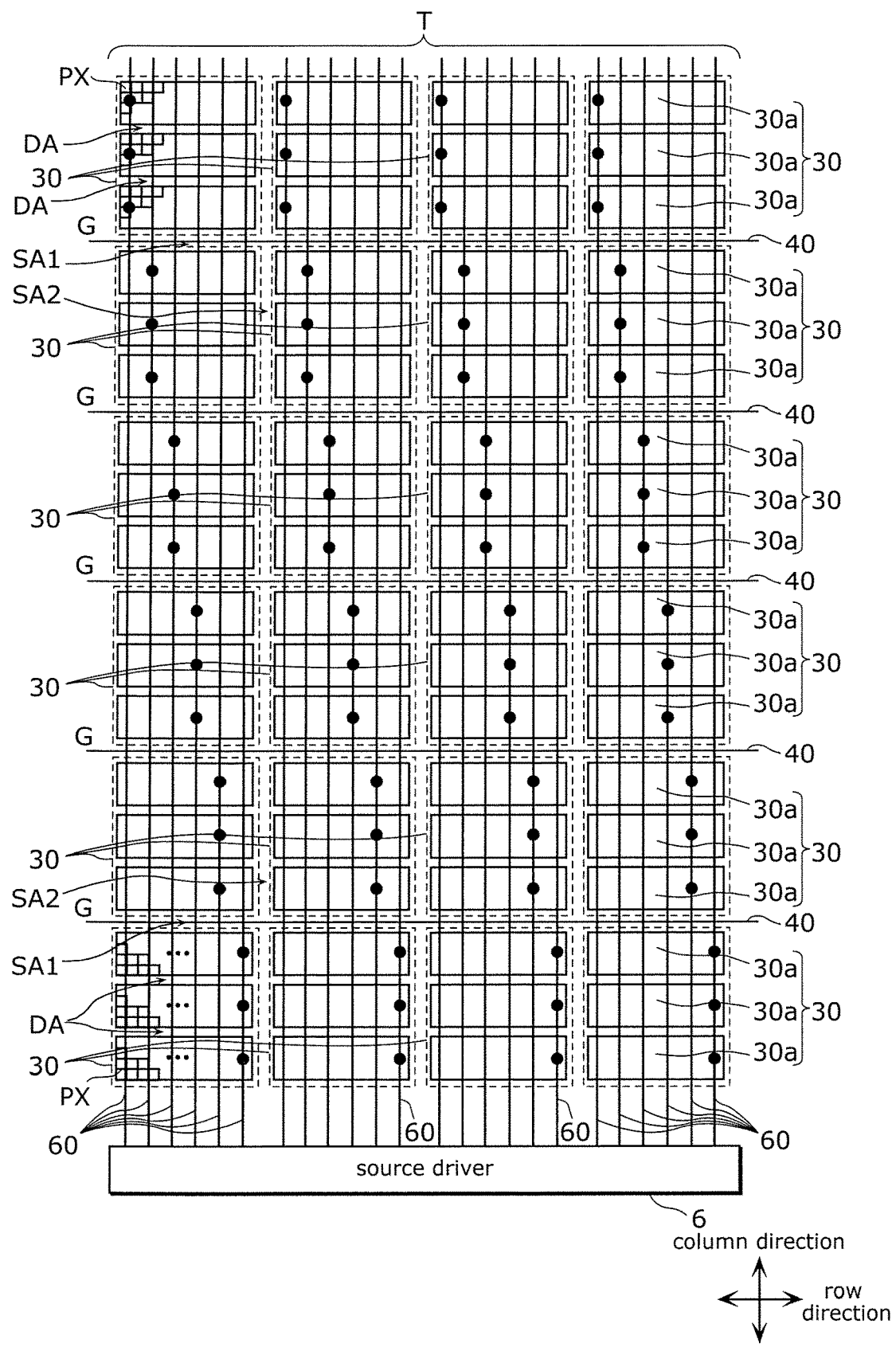
FIG. 9 is a diagram showing an example of a configuration of a common electrode in a liquid crystal display device according to Modification 1.
Figure 10:
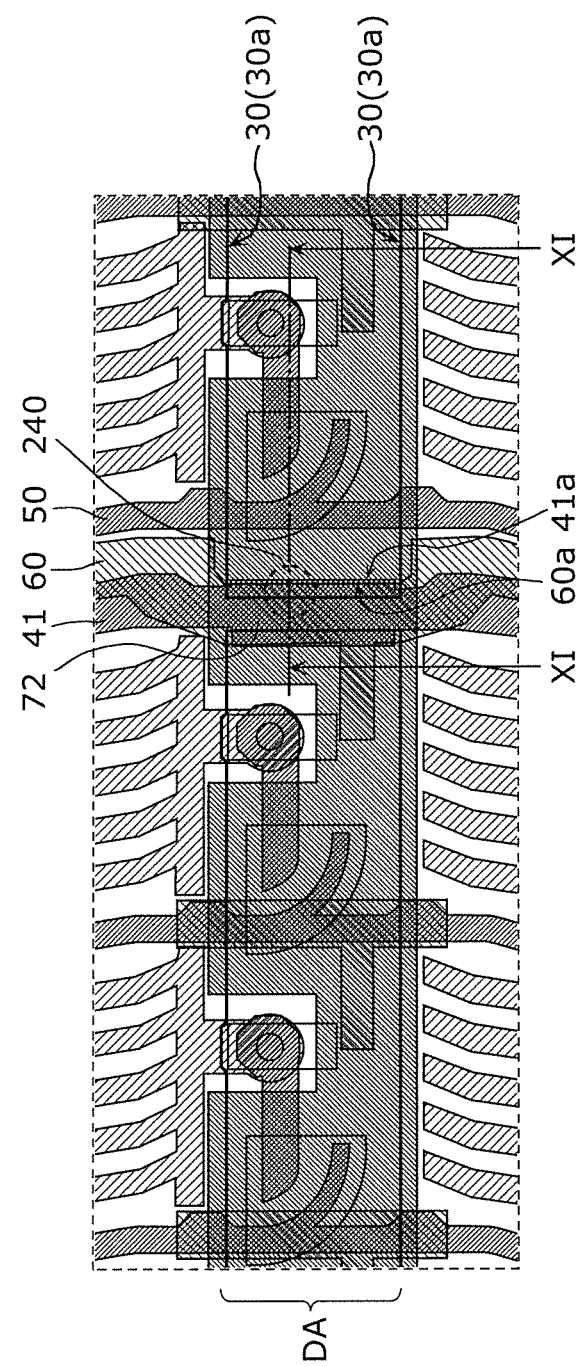
FIG. 10 is a planar view showing a pixel boundary in the liquid crystal display device according to Modification 1.
Figure 11:
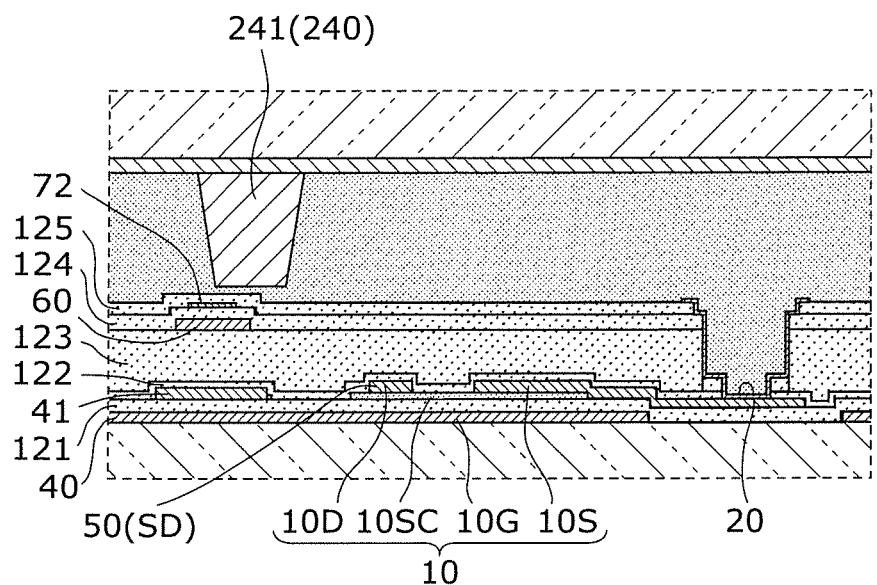
FIG. 11 is a cross-sectional view taken along line XI-XI in FIG. 10.

Next, a liquid crystal display device according to Modification 1 will be described with reference to FIGS. 9 to 11. FIG. 9 is a diagram showing an example of a configuration of common electrode 30 in a liquid crystal display device according to Modification 1. FIG. 10 is a planar view showing a pixel boundary in the liquid crystal display device. FIG. 11 is a cross-sectional view taken along line XI-XI in FIG. 10.

As shown in FIG. 9, in the present modification, each of the plurality of common electrodes 30 further includes a plurality of segment electrodes 30a divided with a region on gate line 40 as divisional region DA. That is, each common electrode 30 is divided into a plurality of segment electrodes 30a with the region on gate line 40 as a boundary. Accordingly, each segment electrode 30a does not face gate line 40 in divisional region DA. Divisional region DA extends along the column direction like first separation region SA1.

Each segment electrode 30a is formed over a plurality of pixels PX arranged in the row direction. Note that each segment electrode 30a may be formed over a plurality of pixels PX arranged not only in the row direction but also in the column direction, but is preferably formed over a plurality of pixels PX corresponding to only one row.

At least one touch line 60 connects each of divided segment electrodes 30a. That is, each common electrode 30 is divided into a plurality of segment electrodes 30a, but constitutes one unit electrode for detecting the touch position. Therefore, each of the plurality of segment electrodes 30a included in one common electrode 30 is electrically connected to each other by at least one touch line 60. FIG. 9 shows an example where each common electrode 30 is divided into three segment electrodes 30a, and three segment electrodes 30a are connected by one touch line 60.

As shown in FIG. 10, two segment electrodes 30a adjacent in the column direction are connected by second bridge portion 72. Second bridge portion 72 is a linear bridge line that crosses over two segment electrodes 30a adjacent in the column direction across one divisional region DA. In the present modification, second bridge portion 72 extends in the column direction.

As shown in FIG. 10, second bridge portion 72 overlaps the portion where touch line 60 and gate lead line 41 overlap. That is, second bridge portion 72 overlaps bent portion 60a of touch line 60. Thus, second bridge portion 72 is provided at a position facing spacer 240 (first spacer 241).

Further, as shown in FIG. 11, second bridge portion 72 is formed in the same layer as common electrode 30 (segment electrode 30a). In this case, second bridge portion 72 is formed continuously with common electrode 30.

Note that second bridge portion 72 across divisional region DA may be provided for each of the plurality of pixels PX arranged in the row direction, or may be formed in some of the plurality of pixels PX arranged in the row direction.

As thus described, in the present modification, second bridge portion 72 overlaps the portion where touch line 60 and gate lead line 41 overlap. That is, second bridge portion 72 is further laminated on the portion where touch line 60 and gate lead line 41 overlap. Thereby, touch line 60, gate lead line 41, and second bridge portion 72 can be laminated, so that the portion functioning as the pedestal for spacer 240 can be raised. Therefore, the gap between first substrate 100 and second substrate 200 (cell gap) can be more easily kept uniform.

In the present modification, second bridge portion 72 is formed in the same layer as common electrode 30, but the present disclosure is not limited to this. For example, second bridge portion 72 may be a part of touch line 60. That is, two adjacent segment electrodes 30a may be connected by touch line 60. In this case, touch line 60 and two adjacent segment electrodes 30a are connected via a contact hole. Thus, while the ability of raising the pedestal for spacer 240 is lost by using a part of touch line 60 as second bridge portion 72, even when common electrode 30 that serves to be one unit electrode as the touch electrode is divided into a plurality of segment electrodes 30a, divided segment electrodes 30a can be connected by touch line 60.

Modification 2

Figure 12:
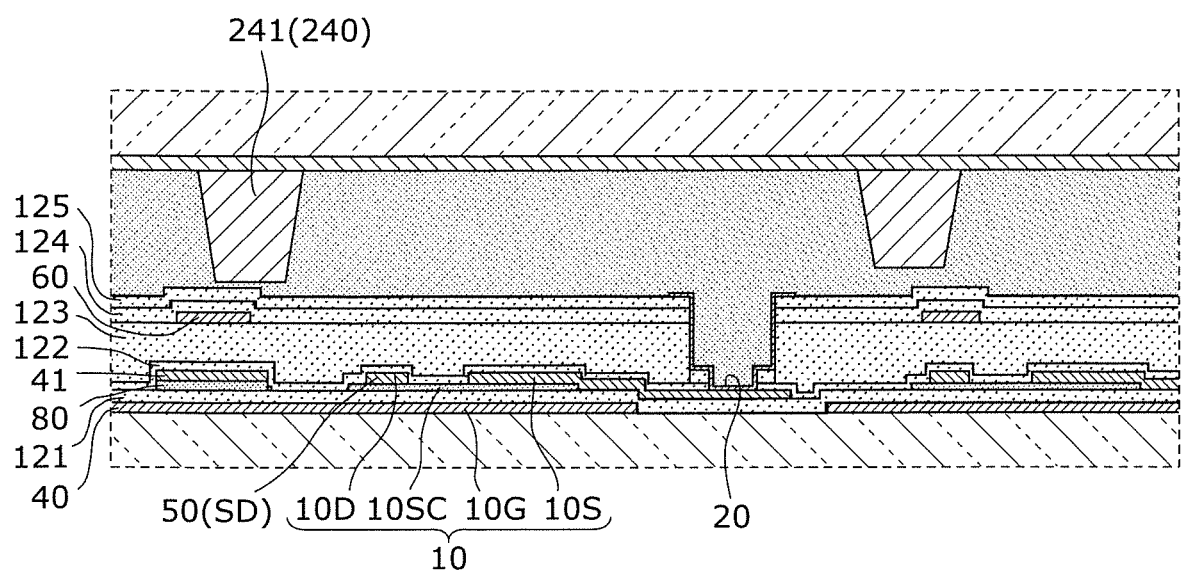
FIG. 12 is a cross-sectional view of a liquid crystal display device according to Modification 2.

Next, a liquid crystal display device according to Modification 2 will be described with reference to FIG. 12. FIG. 12 is a cross-sectional view of a liquid crystal display device according to Modification 2. Note that FIG. 12 corresponds to FIG. 7 showing a cross-sectional view of the liquid crystal display device according to the above exemplary embodiment.

As shown in FIG. 12, the liquid crystal display device according to the present modification is provided with intervening film 80 with respect to liquid crystal display device 1 according to the above exemplary embodiment.

Intervening film 80 is provided at a position facing first spacer 241. Intervening film 80 is thus provided facing the portion where touch line 60 and gate lead line 41 overlap.

Intervening film 80 is formed in the same layer as semiconductor layer 10SC of transistor 10. Therefore, intervening film 80 is interposed between a wiring layer (SD layer) in which gate lead line 41 is formed and a wiring layer (GAL layer) in which gate line 40 is formed. Specifically, intervening film 80 is interposed between the wiring layer (SD layer) in which gate lead line 41 is formed and an insulating layer (GI layer) in which first insulating film 121 is formed. In the present modification, a width of intervening film 80 is the same as a width of gate lead line 41 but is not limited to this.

As described above, in the present modification, intervening film 80 overlaps the portion where touch line 60 and gate lead line 41 overlap. That is, intervening film 80 is further laminated on the portion where touch line 60 and gate lead line 41 overlap. Thereby, touch line 60, gate lead line 41, and intervening film 80 can be laminated, so that the part to be functioned as the pedestal for spacer 240 can be raised. Therefore, the gap between first substrate 100 and second substrate 200 (cell gap) can be more easily kept uniform.

Modification 3

Figure 13:
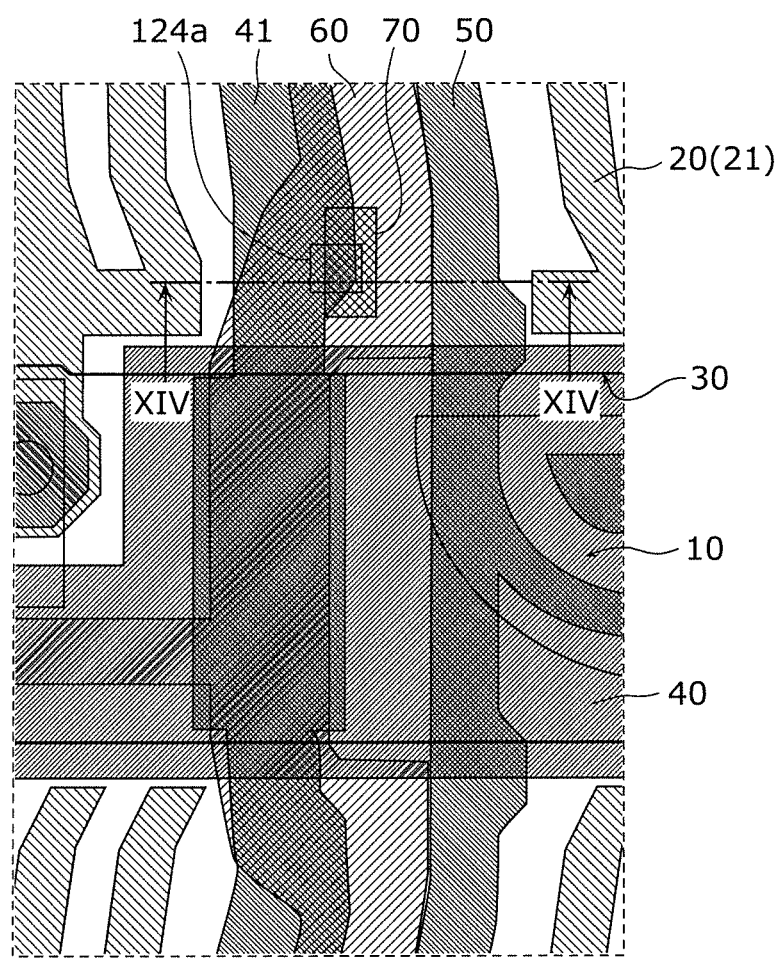
FIG. 13 is a planar view showing a configuration around a contact hole in a liquid crystal display device according to Modification 3.
Figure 14:
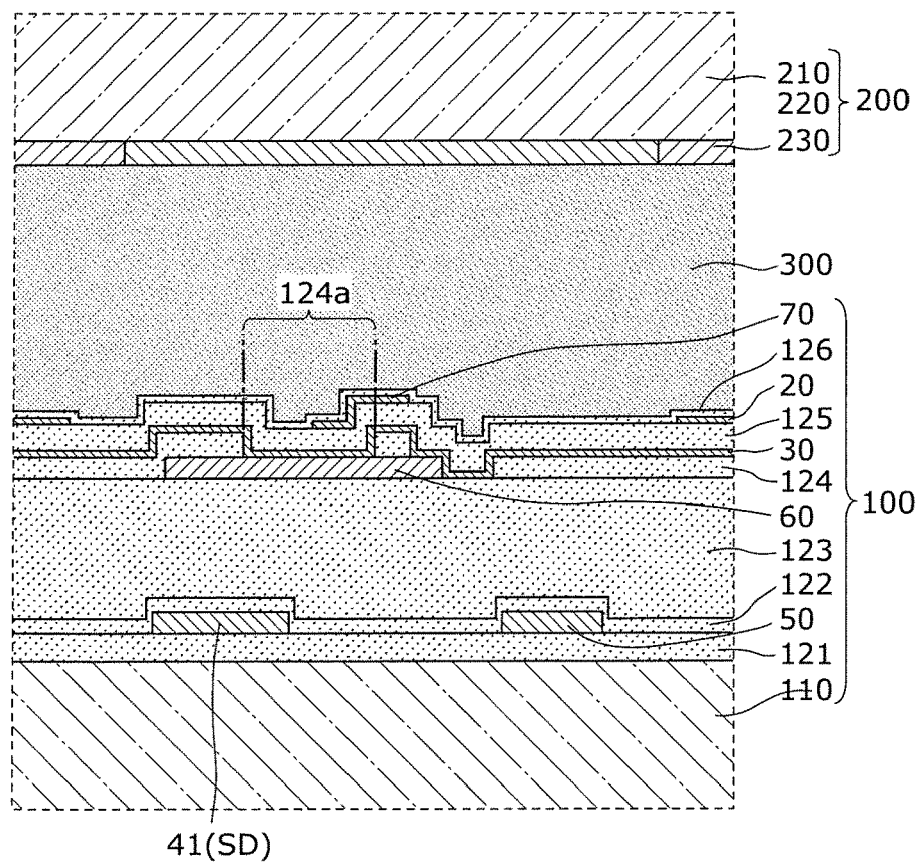
FIG. 14 is a cross-sectional view of the liquid crystal display device according to Modification 3 along the line XIV-XIV in FIG. 13.

Next, an in-cell touch panel according to Modification 3 will be described with reference to FIGS. 13 and 14. FIG. 13 is a planar view showing a configuration around contact hole 124a in the in-cell touch panel according to Modification 3. FIG. 14 is a cross-sectional view taken along line XIV-XIV in FIG. 13.

In liquid crystal display device 1 according to the above exemplary embodiment, contact hole 124a contacting common electrode 30 and touch line 60 has partially overlapped touch line 60 and protruded from touch line 60 in the planar view, whereas in the in-cell touch panel in the present modification, as shown in FIGS. 13 and 14, contact hole 124a is formed on touch line 60 without protruding from touch line 60 in the planar view.

Instead, in the in-cell touch panel according to the present modification, contact film 70 is formed in contact hole 124a. Contact film 70 is in contact with alignment film 126. Contact film 70 is disposed away from pixel electrode 20.

Further, contact film 70 is formed in the same layer as pixel electrode 20. That is, contact film 70 is formed in a predetermined shape at the same time as the ITO film is patterned to form pixel electrode 20 having a predetermined shape. In the present exemplary embodiment, contact film 70 has been formed in a rectangular island shape in planar view, but the shape of contact film 70 is not limited to a rectangle but may be a circle or the like.

Contact film 70 is formed so as to partially overlap contact hole 124a in the planar view. Thereby, contact film 70 is formed in the state of being laid across the step portion at the end of contact hole 124a. Hence contact film 70 is formed in a step shape.

Accordingly, when the alignment film liquid for forming alignment film 126 is applied to the surface of fifth insulating film 125, the alignment film liquid easily spreads by touching the step of contact film 70. Thus, as in liquid crystal display device 1 according to the above exemplary embodiment, the alignment film liquid can be prevented from remaining at the edge of contact hole 124a when the alignment film liquid is applied. As a result, the alignment film liquid can be applied with a uniform film thickness at the edge of contact hole 124a, and the alignment film liquid can be easily introduced into contact hole 124a. That is, contact film 70 functions as an introduction film for spreading the alignment film liquid and introducing the alignment film liquid into contact hole 124a, and a portion where contact film 70 is formed becomes an introduction part into which the alignment film liquid is introduced. Therefore, alignment film 126 having a uniform thickness can be formed, and alignment film 126 can be formed even on the inside of contact hole 124a. As a result, the liquid crystal molecules in the liquid crystal layer can be initially aligned at a desired angle even near contact hole 124a. Hence the occurrence of display unevenness or light leakage can be prevented, thus preventing a decrease in image quality.

Moreover, in the present modification, contact hole 124a is formed on touch line 60 without protruding from touch line 60.

Accordingly, at the time of forming contact hole 124a by photolithography and etching, touch line 60 under contact hole 124a can be used as an etching stopper. For example, at the time of forming contact hole 124a in fourth insulating film 124 made of an inorganic material by dry etching, it is possible to prevent damage on third insulating film 123, made of an organic material under touch line 60 by dry etching.

One contact film 70 may be provided for each pixel PX, or a plurality of contact films 70 may be provided for each pixel PX. Alternatively, contact film 70 may be intermittently provided in the plurality of pixels PX in the column direction or the row direction. In this case, the plurality of contact films 70 are preferably arranged linearly in the row direction or the column direction.

Modification 4

Figure 15:
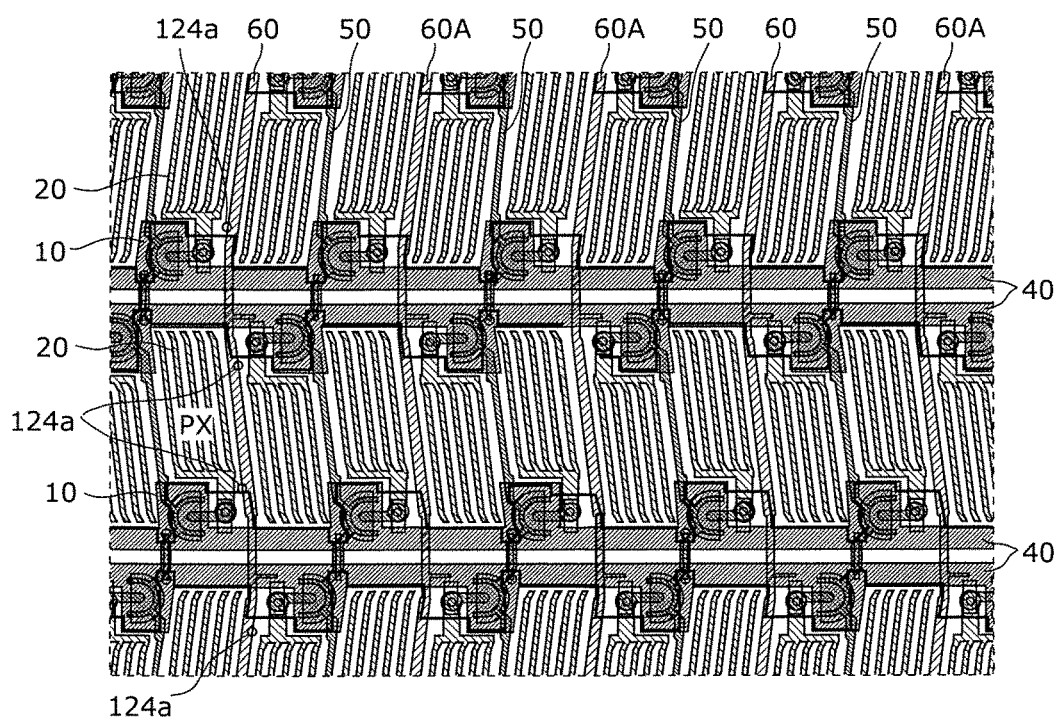
FIG. 15 is a planar view showing a configuration of pixels of a liquid crystal display device according to Modification 4.

Next, a liquid crystal display device according to Modification 4 will be described with reference to FIG. 15. FIG. 15 is a planar view showing a configuration of pixels of the liquid crystal display device according to Modification 4.

In liquid crystal display device 1 according to the above exemplary embodiment, contact hole 124a that connects common electrode 30 and touch line 60 has partially overlapped the corner of the bent portion of touch line 60 in the planar view, whereas in the liquid crystal display device according to the present modification, contact hole 124a partially overlaps with the straight line portion of touch line 60.

In the present modification, a center of contact hole 124a is shifted from a center of a width of touch line 60. Specifically, contact hole 124a is shifted from the center of the width of touch line 60 to one side of touch line 60 in the width direction.

Furthermore, in the present modification, two contact holes 124a are formed in each of the plurality of pixels PX. The offset directions of one and the other of two contact holes 124a with respect to touch line 60 are opposite directions. Specifically, one contact hole 124a out of two contact holes 124a is shifted from the center of the width of touch line 60 to one side of touch line 60 in the width direction, and the other contact hole 124a is shifted from the center of the width of touch line 60 to the other side of touch line 60 in the width direction.

Accordingly, even when the mask for forming contact hole 124a is shifted in the row direction, at least one of two contact holes 124a can be partially overlapped with touch line 60.

In the present modification, the dual-gate structure has been adopted, and two gate lines 40 have been provided at each boundary between two pixels PX adjacent in the column direction, but the present disclosure is not limited to this. In the present modification, touch lines 60 and the dummy touch lines 60A are alternately arranged for each pixel column, but the present disclosure is not limited to this. In the present modification, two contact holes 124a have been formed in one pixel PX, but the present disclosure is not limited to this. For example, three or more contact holes 124a may be formed in one pixel PX. Note that the present modification can also be applied to Modification 3.

OTHER MODIFICATIONS

As described above, the liquid crystal display device, the image display device, and the like according to the present disclosure have been described based on the exemplary embodiment and the modifications, but the present disclosure is not limited to the above exemplary embodiment and modifications.

For example, in the above exemplary embodiment and modification, data line 50 and the drain electrode 10D of transistor 10 have been connected and pixel electrode 20 and source electrode 10S of transistor 10 have been connected. However, the present disclosure is not limited to this. For example, data line 50 and source electrode 10S of transistor 10 may be connected, and pixel electrode 20 and drain electrode 10D of transistor 10 may be connected.

In the above exemplary embodiment and modification, gate line 40 has extended in the row direction, and data line 50, touch line 60, and gate lead line 41 have extended in the column direction. However, the present disclosure is not limited to this. Gate line 40 may extend in the column direction, and data line 50, touch line 60, and gate lead line 41 may extend in the row direction. That is, the first direction may be the column direction and the direction orthogonal to the first direction may be the row direction. In this case, three types of pixels of red pixel PXR, green pixel PXG, and blue pixel PXB may be arranged periodically in the column direction in a predetermined arrangement, and gate driver 5 and source driver 6 may be mounted at an end of liquid crystal display device 1 on the row direction side.

Those skilled in the art will readily appreciate that many modifications are possible in the above exemplary embodiment and variations without materially departing from the novel teachings and advantages of the present disclosure. Accordingly, all such modifications are intended to be included within the scope of the present disclosure.

What is claimed is:

1. A liquid crystal display device having an image display region made up of a plurality of pixels arranged in a first direction and a second direction intersecting the first direction, the liquid crystal display device comprising:
   transistors and pixel electrodes respectively provided in the plurality of pixels;
   a common electrode facing the pixel electrodes;
   gate lines extending along the first direction and supplying gate signals to the transistors respectively;
   gate lead lines extending in the second direction and respectively connected to the gate lines at at least one of a plurality of intersections between the gate lead lines and the gate lines;
   data lines extending along the second direction and supplying data signals to the transistors respectively; and
   common lines extending along the second direction and connected to the common electrode,
   wherein in a planar view, the common lines partially overlap the gate lead lines respectively.

2. The liquid crystal display device according to claim 1, wherein the common lines partially overlap the gate lead lines on at least the gate lines, respectively.

3. The liquid crystal display device according to claim 2, wherein a ratio of overlapping between the common line and the gate lead line is larger in a portion where the common line overlaps the gate line than in a portion located between two gate lines adjacent in the second direction.

4. The liquid crystal display device according to claim 2, wherein the common line is bent so as to overlap the gate lead line.

5. The liquid crystal display device according to claim 1, further comprising
   a spacer facing a portion where the common line and the gate lead line overlap.

6. The liquid crystal display device according to claim 1, wherein
   a plurality of the common electrodes are arranged in the first direction and the second direction, and configured as a plurality of touch electrodes that each face one or more of the pixel electrodes and are separated from each other, and
   the common lines are touch lines respectively connected to the touch electrodes, and are configured to detect a touch position when a user touches the liquid crystal display device.

7. The liquid crystal display device according to claim 6, further comprising:
   an insulating film formed between the plurality of the common electrodes and the plurality of touch lines; and
   an alignment film covering the pixel electrodes,
   wherein
   each touch line is connected to a corresponding one of the touch electrodes via a corresponding contact hole formed in the insulating film, and
   in a planar view, the contact holes partially overlap the touch lines respectively.

8. The liquid crystal display device according to claim 6, wherein
   each common electrode is separated into a plurality of segment electrodes with divisional regions on the gate lines, and
   includes a bridge portion provided crossing over two of the plurality of segment electrodes adjacent in the second direction across one of the divisional regions, the liquid crystal display device comprises a spacer facing a portion where the common line and the gate lead line overlap, and
   the bridge portion faces the spacer.

9. The liquid crystal display device according to claim 1, wherein
   the transistor has a semiconductor layer as a channel layer,
   an intervening film formed in a same layer as the semiconductor layer is provided at a position facing the spacer, and
   the intervening film is placed between a wiring layer formed with the gate lead lines and a wiring layer formed with the gate lines.

10. A liquid crystal display device having an image display region made up of a plurality of pixels arranged in a first direction and a second direction intersecting the first direction, the liquid crystal display device comprising:
    transistors and pixel electrodes respectively provided in pixels;
    common electrodes arranged in the first direction and the second direction, each faces one or more of the pixel electrodes and are provided separately from each other;
    gate lines extending along the first direction and supplying gate signals to the transistors respectively;
    gate lead lines extending in the second direction and respectively connected to the gate lines at at least one of a plurality of intersections between the gate lead lines and the gate lines,
    data lines extending along the second direction and supplying data signals to the transistors respectively;
    touch lines extending along the second direction;
    an insulating film formed between the common electrodes and the touch lines; and
    an alignment film covering the pixel electrodes,
    wherein
    each touch line is connected to a corresponding one of the common electrodes via a corresponding contact hole formed in the insulating film,
    in a planar view, the contact holes partially overlap the touch lines respectively, and
    the contact hole is formed between the gate lead line and the data line.

11. The liquid crystal display device according to claim 10, wherein the contact hole partially overlaps a corner of the touch line.

12. The liquid crystal display device according to claim 10, wherein a center of the contact hole is shifted from a center of a width of the touch line.

13. The liquid crystal display device according to claim 12, wherein
    two contact holes are formed in each of the plurality of pixels, and
    an offset direction of one of the two contact holes are in the opposite direction from an offset direction of the other of the two contact holes with respect to the touch line.

14. The liquid crystal display device according to claim 10, further comprising:
    a first insulating film formed on the gate lines;
    a second insulating film formed on the first insulating film;
    a third insulating film that is formed on the second insulating film and is thicker than the second insulating film; and
    a fourth insulating film formed on the third insulating film, wherein the third insulating film is made of an organic material, the data lines are formed between the first insulating film and the second insulating film, the touch lines are formed between the third insulating film and the fourth insulating film, the common electrodes are formed on the fourth insulating film, the pixel electrodes are formed above the common electrodes, and the insulating film formed with the contact hole is the fourth insulating film.

15. The liquid crystal display device according to claim 10, further comprising:

a first insulating film formed on the gate lines;

a second insulating film formed on the first insulating film;

a third insulating film that is formed on the second insulating film and is thicker than the second insulating film; and a fourth insulating film formed above the third insulating film, wherein the third insulating film is made of an organic material, the data lines are formed between the first insulating film and the second insulating film, the common electrodes are formed between the third insulating film and the fourth insulating film, the touch lines are formed on the fourth insulating film, the pixel electrodes are formed above the touch lines, and the insulating film formed with the contact holes is the fourth insulating film.

16. A liquid crystal display device having an image display region made up of a plurality of pixels arranged in a first direction and a second direction intersecting the first direction, the liquid crystal display device comprising:

transistors and pixel electrodes respectively provided in pixels;

common electrodes arranged in the first direction and the second direction, each faces one or more of the pixel electrodes and are provided separately from each other;

gate lines extending along the first direction and supplying gate signals to the transistors respectively;

data lines extending along the second direction and supplying data signals to the transistors respectively;

touch lines extending along the second direction;

an insulating film formed between the common electrodes and the touch lines;

a contact film formed in a same layer as the pixel electrodes and space apart from the pixel electrodes; and an alignment film covering the pixel electrodes and the contact film, wherein each touch line is connected to a corresponding one of the common electrodes via a corresponding contact hole formed in the insulating film, the contact holes are respectively formed on the touch lines, and in a planar view, the contact film partially overlaps the contact hole.

17. The liquid crystal display device according to claim 16, wherein the contact hole partially overlaps a corner of the touch line.

18. The liquid crystal display device according to claim 16, wherein the contact film is shifted from a center of the contact hole.

19. The liquid crystal display device according to claim 16, wherein two sets of the contact holes and the contact films are formed for each of the plurality of pixels, and an offset direction of the contact film with respect to a center of the contact hole in one set among the two sets are in the opposite direction from an offset direction of the contact film with respect to a center of the contact hole in the other set among the two sets.

* * * * *